United States Patent
Morris

(10) Patent No.: US 10,033,672 B1
(45) Date of Patent: Jul. 24, 2018

(54) METHODS AND COMPUTER PROGRAM PRODUCTS FOR BROWSING USING A COMMUNICANT IDENTIFIER

(71) Applicant: Sitting Man, LLC, Raleigh, NC (US)

(72) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 0 days.

(21) Appl. No.: 15/803,823

(22) Filed: Nov. 5, 2017

Related U.S. Application Data

(63) Continuation-in-part of application No. 15/800,033, filed on Oct. 31, 2017, which is a continuation-in-part of application No. 14/274,623, filed on May 9, 2014, now abandoned, which is a continuation-in-part of application No. 13/654,647, filed on Oct. 18, 2012, now abandoned, and a continuation-in-part of
(Continued)

(51) Int. Cl.
| | |
|---|---|
| *G06F 3/048* | (2013.01) |
| *H04L 12/58* | (2006.01) |
| *H04L 29/08* | (2006.01) |
| *G06F 3/0482* | (2013.01) |
| *G06F 3/0488* | (2013.01) |
| *H04L 29/12* | (2006.01) |
| *G06F 3/0485* | (2013.01) |

(52) U.S. Cl.
CPC .......... *H04L 51/046* (2013.01); *G06F 3/0482* (2013.01); *H04L 51/10* (2013.01); *H04L 67/02* (2013.01); *G06F 3/0485* (2013.01); *G06F 3/0488* (2013.01); *H04L 51/02* (2013.01); *H04L 51/18* (2013.01); *H04L 61/1547* (2013.01)

(58) Field of Classification Search
None
See application file for complete search history.

(56) References Cited

U.S. PATENT DOCUMENTS

| | | |
|---|---|---|
| 6,192,394 B1 | 2/2001 | Gutfreund et al. |
| 6,502,236 B1 | 12/2002 | Allen et al. |
| (Continued) | | |

FOREIGN PATENT DOCUMENTS

WO 2002077773 A3 6/2009

OTHER PUBLICATIONS

Berners-Lee, T, et al, "Uniform Resource Identifier (URI): Generic Syntax", RFC 3986, pp. 1-61, Jan. 2005, Internet Engineering Task Farce (IEFT), http://www.ietf.org/rfc/rfc3986.txt.
(Continued)

*Primary Examiner* — Thanh Vu
(74) *Attorney, Agent, or Firm* — Patrick E. Caldwell, Esq.; The Caldwell Firm, LLC

(57) ABSTRACT

In one embodiment, a computer-implemented method is provided, comprising: creating at least a portion of an instant messaging application that is configured to cooperate with an apparatus, the instant messaging application, when executed, configured to cause a device to: display an instant messaging interface including a communicant message user interface element and a send user interface element, and receive, from the apparatus and utilizing a communications agent on the device configured to receive incoming messages addressed to a communicant identifier associated with a user of the instant messaging application, one or more user interface elements including a first button.

30 Claims, 14 Drawing Sheets

Related U.S. Application Data application No. 13/716,156, filed on Dec. 16, 2012, now abandoned, and a continuation-in-part of application No. 13/716,159, filed on Dec. 16, 2012, now abandoned.

(56) References Cited

U.S. PATENT DOCUMENTS

| | | |
|---|---|---|
| 6,996,599 B1 | 2/2006 | Anders et al. |
| 7,051,119 B2 | 5/2006 | Shafron et al. |
| 7,080,120 B2 | 7/2006 | Betros et al. |
| 7,130,883 B2 | 10/2006 | Zhu et al. |
| 7,133,897 B1 | 11/2006 | Tran |
| 7,209,953 B2 | 4/2007 | Brooks |
| 7,328,239 B1 | 2/2008 | Berberian et al. |
| 7,421,069 B2 | 9/2008 | Vernon et al. |
| 7,426,578 B2 | 9/2008 | Jones et al. |
| 7,529,798 B2 | 5/2009 | Rust |
| 7,533,146 B1 | 5/2009 | Kumar |
| 7,567,553 B2 | 7/2009 | Morris |
| 7,613,772 B2 | 11/2009 | Bartram et al. |
| 7,623,650 B2 | 11/2009 | Dalton et al. |
| 7,624,148 B2 | 11/2009 | Dalen |
| 7,653,668 B1 | 1/2010 | Shelat et al. |
| 7,680,950 B1 | 3/2010 | Slaughter et al. |
| 7,701,882 B2 | 4/2010 | Jones et al. |
| 7,757,265 B2 | 7/2010 | Reynolds et al. |
| 7,765,581 B1 | 7/2010 | Caronni et al. |
| 7,783,718 B2 | 8/2010 | Modi |
| 7,809,709 B1 | 10/2010 | Harrison |
| 7,809,854 B2 | 10/2010 | Jung et al. |
| 7,904,369 B1 | 3/2011 | Andreasen et al. |
| 7,949,722 B1 | 5/2011 | Ullman et al. |
| 7,953,853 B2 | 5/2011 | Christensen et al. |
| 8,020,190 B2 | 9/2011 | Plummer |
| 8,060,619 B1 | 11/2011 | Saulpaugh et al. |
| 8,214,329 B2 | 7/2012 | Gilder et al. |
| 8,224,298 B2 | 7/2012 | Smith et al. |
| 8,280,948 B1 | 10/2012 | Chen |
| 8,321,499 B2 | 11/2012 | Reisman |
| 8,332,654 B2 | 12/2012 | Anbuselvan |
| 8,359,361 B2 | 1/2013 | Thornton et al. |
| 8,583,745 B2 | 11/2013 | Bearman et al. |
| 8,671,145 B2 | 3/2014 | Roskowski et al. |
| 8,683,576 B1 | 3/2014 | Yun |
| 8,719,251 B1 | 5/2014 | English et al. |
| 8,775,511 B2 | 7/2014 | Vernon et al. |
| 8,812,733 B1 | 8/2014 | Black et al. |
| 8,824,643 B2 | 9/2014 | Sahai |
| 8,849,914 B2 | 9/2014 | Bove et al. |
| 8,909,710 B2 | 12/2014 | Blackstock et al. |
| 8,949,340 B2 | 2/2015 | Smith et al. |
| 8,996,658 B2 | 3/2015 | Anbuselvan |
| 9,053,203 B2 | 6/2015 | Wilson et al. |
| 9,299,056 B2 | 3/2016 | Kallman et al. |
| 2002/0087505 A1 | 7/2002 | Smith et al. |
| 2002/0087522 A1 | 7/2002 | MacGregor et al. |
| 2002/0143855 A1 | 10/2002 | Traversat et al. |
| 2002/0147840 A1 | 10/2002 | Mutton et al. |
| 2003/0172127 A1 | 9/2003 | Northrup et al. |
| 2003/0200268 A1 | 10/2003 | Morris |
| 2004/0015610 A1 | 1/2004 | Treadwell |
| 2004/0024754 A1 | 2/2004 | Mane et al. |
| 2004/0044727 A1 | 3/2004 | Abdelaziz et al. |
| 2004/0064478 A1 | 4/2004 | Canesi |
| 2004/0064511 A1 | 4/2004 | Abdel-Aziz et al. |
| 2004/0088347 A1 | 5/2004 | Yeager et al. |
| 2004/0117456 A1 | 6/2004 | Brooks |
| 2004/0186894 A1 | 9/2004 | Jhingan et al. |
| 2005/0010646 A1 | 1/2005 | Shiina |
| 2005/0102348 A1 | 5/2005 | Parsons et al. |
| 2005/0114664 A1 | 5/2005 | Davin |
| 2005/0114671 A1 | 5/2005 | Little et al. |
| 2005/0223073 A1 | 10/2005 | Malik |
| 2006/0069787 A1 | 3/2006 | Sinclair et al. |
| 2006/0095531 A1 | 5/2006 | Cho |
| 2006/0224583 A1 | 10/2006 | Fikes et al. |
| 2006/0224608 A1 | 10/2006 | Zamir et al. |
| 2006/0224615 A1 | 10/2006 | Korn et al. |
| 2006/0224624 A1 | 10/2006 | Korn et al. |
| 2006/0224938 A1 | 10/2006 | Fikes et al. |
| 2006/0256934 A1 | 11/2006 | Mazor |
| 2007/0067726 A1 | 3/2007 | Flynt et al. |
| 2007/0078902 A1 | 4/2007 | Buschi et al. |
| 2007/0100713 A1 | 5/2007 | Favero et al. |
| 2007/0180150 A1 | 8/2007 | Eisner et al. |
| 2008/0005103 A1 | 1/2008 | Ratcliffe et al. |
| 2008/0016160 A1 | 1/2008 | Walter et al. |
| 2008/0059500 A1 | 3/2008 | Symens |
| 2008/0098075 A1 | 4/2008 | O'Bryan et al. |
| 2008/0155110 A1 | 6/2008 | Morris |
| 2008/0201364 A1 | 8/2008 | Buschi et al. |
| 2008/0256199 A1 | 10/2008 | Pesala |
| 2008/0320094 A1 | 12/2008 | Tu et al. |
| 2009/0157829 A1 | 6/2009 | Choi et al. |
| 2009/0157859 A1 | 6/2009 | Morris |
| 2009/0177526 A1 | 7/2009 | Aaltonen et al. |
| 2009/0222450 A1 | 9/2009 | Zigelman |
| 2009/0254601 A1 | 10/2009 | Moeller et al. |
| 2009/0265426 A1 | 10/2009 | Svendsen et al. |
| 2009/0292595 A1* | 11/2009 | Tonnison ............... G06Q 30/02 705/14.1 |
| 2009/0327904 A1 | 12/2009 | Guzak et al. |
| 2010/0011077 A1 | 1/2010 | Shkolnikov et al. |
| 2010/0070602 A1 | 3/2010 | Malik |
| 2010/0169442 A1 | 7/2010 | Liu et al. |
| 2010/0235439 A1 | 9/2010 | Goodnow |
| 2010/0312782 A1 | 12/2010 | Li et al. |
| 2011/0072033 A1 | 3/2011 | White et al. |
| 2011/0138004 A1 | 6/2011 | McConn et al. |
| 2011/0276637 A1 | 11/2011 | Thornton et al. |
| 2012/0011207 A1 | 1/2012 | Morris |
| 2012/0011444 A1 | 1/2012 | Morris |
| 2012/0197753 A1* | 8/2012 | Kalin ..................... G06Q 30/06 705/26.8 |
| 2013/0046992 A1 | 2/2013 | Resch et al. |
| 2014/0089419 A1 | 3/2014 | Morris |
| 2014/0089420 A1 | 3/2014 | Morris |
| 2014/0089421 A1 | 3/2014 | Morris |
| 2014/0108487 A1 | 4/2014 | Rosset et al. |
| 2014/0112319 A1 | 4/2014 | Morris |
| 2014/0129942 A1* | 5/2014 | Rathod ............ H04N 21/44222 715/720 |
| 2014/0172999 A1 | 6/2014 | Morris |
| 2014/0279050 A1 | 9/2014 | Makar et al. |
| 2017/0372283 A1* | 12/2017 | Killoran, Jr. ........... G06Q 20/12 |

OTHER PUBLICATIONS

Crocker, D, "Standard for the Format of ARPA Internet Text Messages", RFC 822, pp. 1-47, Aug. 1982, Internet Engineering Task Force (IEFT), http://www.ietf.org/rfc/rfc822.txt.

Fielding, R, et al, "Hypertext Transfer Protocol—HTIP/1.1", RFC 2616, pp. 1-114, Jun. 1999, Internet Engineering Task Force (IEFT), http://www.ietf.org/rfc/rfc2616.txt.

Freed, N, et al, "Multipurpose Internet Mail Extensions (MIME) Part 1: Format of Internet Message Bodies", RFC 2045, pp. 1-31, Nov. 1996, Internet Engineering Task Force (IEFT), http://www.ietf.org/rfc/rfc2045.txt.

Hoffman, P, et al, "The mailto URL scheme", RFC 2368, pp. 1-10, Jul. 1998, Internet Engineering Task Force (IEFT), http://www.ietf.org/rfc/rfc2368. txt.

Klensin, J, "Simple Mail Transfer Protocol", RFC 5321, pp. 1-95, Oct. 2008, Internet Engineering Task Force (IEFT), http://www.ietf.org/rfc/rfc5321.txt.

Myers, J, et al, "Post Office Protocol—version 3", RFC 1939, pp. 1-23, May 1996, Internet Engineering Task Force (IEFT), http://www.ietf.org/rfc/rfc1939.txt.

O. S. Goh, C. C. Fung and K. W. Wong, "VisualChat: A Visualization Tool for Human-Machine Interaction," 2008 IEEE/WIC/ACM International Conference on Web Intelligence and Intelligent Agent

(56) References Cited

OTHER PUBLICATIONS

Technology, Sydney, NSW, 2008, pp. 131-134, available at http://ieeexplore.ieee.org/document/4740744/?reload=true.
Office Action Summary in U.S. Appl. No. 12/833,014 dated Aug. 2, 2012.
Office Action Summary in U.S. Appl. No. 12/833,016 dated Feb. 14, 2014.
Office Action Summary in U.S. Appl. No. 12/833,016 dated May 10, 2013.
Office Action Summary in U.S. Appl. No. 12/833,016 dated Sep. 20, 2012.
Office Action Summary in U.S. Appl. No. 13/624,906 dated Dec. 31, 2014.
Office Action Summary in U.S. Appl. No. 13/624,940 dated Jul. 18, 2014.
Office Action Summary in U.S. Appl. No. 13/626,635 dated Aug. 29, 2014.
Office Action Summary in U.S. Appl. No. 13/647,144 dated Dec. 1, 2014.
Office Action Summary in U.S. Appl. No. 13/654,647 dated Sep. 25, 2014.
Office Action Summary in U.S. Appl. No. 13/716,156 dated Mar. 26, 2015.
Office Action Summary in U.S. Appl. No. 13/716,158 dated May 8, 2015
Office Action Summary in U.S. Appl. No. 13/716,159 dated Oct. 7, 2015.
Office Action Summary in U.S. Appl. No. 13/716,160 dated Oct. 26, 2015.
Office Action Summary in U.S. Appl. No. 14/274,623 dated Mar. 29, 2017.
Office Action Summary in U.S. Appl. No. 14/274,623 dated Oct. 3, 2016.
Press Release, "Amazon.com Launches "Amazon TextBuyIt," Making It Fast and Easy for Customers to Shop and Buy on Amazon.com Using Text Messages", Amazon, Apr. 2, 2008, available at http://phx.corporate-ir.net/phoenix.zhtml?c=176060&p=irol-newsArticle&ID=1124741.
Press Release, "Premier wireless operator in the US selects eGain virtual assistant technology to provide innovative, multilingual customer self-service" eGain, Oct. 6, 2011, available at http://www.egain.com/company/news/press_releases_2011/premier-wireless-operator-in-the-us-selects-egain-virtual-assistant-technology-to-provide-innovative-multilingual-customer-self-service/.
Resnick, E, "Internet Message Format", RFC 5322, pp. 1-57, Oct. 2008, Internet Engineering Task Force (IEFT), http://www.ietf.org/rfc/rfc5322.txt.
Richardson T, et al, "The Remote Framebuffer Protocol", RFC 6143, pp. 1-39, Mar. 2011, Internet Engineering Task Force (IEFT), http://www.ietf.org/rfc/rfc6143.txt.
Rosenberg, J, et al, "SIP: Session Initiation Protocol", RFC 3261, pp. 1-269, Jun. 2002, Internet Engineering Task Force (IEFT), http://www.ietf.org/rfc/rfc3261.txt.
Rothman, Wilson "Amazon "Simple" TextBuyIt Text-Message Shopping Sounds Complicated", Gizmodo, Apr. 2, 2008, available at https://gizmodo.com/375115/amazon-simple-textbuyit-text-message-shopping-sounds-complicated.
Simonite, Tom, "Shopping via Text Message," MIT Technology Review, Business Report, Nov. 23, 2010, available at https://www.technologyreview.com/s/421784/shopping-via-text-message/.
Website Page, "Sending video via text message", Android Central, Jan. 26, 2014, available at https://forums.androidcentral.com/motorola-droid-x/46718-sending-video-via-text-message.html.
Wilde, E, et al, "URI Scheme for Global System for Mobile Communications (GSM) Short Message Service", RFC 5724, pp. 1-18, Jan. 2010, Internet Engineering Task Force (IEFT), http://www.ietf.org/rfc/rfc5724.txt.

\* cited by examiner

800a

800b

```
                                   ┌─ 808c
                                                800c         ┌─ 802c
From: somebody@somewhere.com
To: shopping@amazon.com/add?sku=sku01234EM0X55;cartid=004385
CC: myaccountant@cpafirm.com/ledger
Subject: Shopping-Music
Thread-Topic: Shopping-Music                    ── 804c
Thread-Index: Ac3CrB/UUi5Q01H2RWiTnh42wSqVnA==
Date: Mon, 12 Nov 2012 21:07:59 +0000
Message-ID:<92E733175C246B10AFFF@xdb02.somewhere.com.com>
Accept-Language: en-US
Content-Language: en-US
Command-Type: POST
                        ── 804c
```

FIG. 8C

METHODS AND COMPUTER PROGRAM PRODUCTS FOR BROWSING USING A COMMUNICANT IDENTIFIER

RELATED APPLICATIONS

The present application is a continuation-in-part of and claims priority to U.S. application Ser. No. 15/800,033 filed Oct. 31, 2017 and entitled "METHODS, SYSTEMS, AND COMPUTER PROGRAM PRODUCTS FOR PROCESSING A DATA OBJECT IDENTIFICATION REQUEST IN A COMMUNICATION" which in turn is a continuation-in-part of and claims priority to U.S. application Ser. No. 14/274,623 (published as US 2014-0365588 A1) filed May 9, 2014 and entitled "METHODS, SYSTEMS, AND COMPUTER PROGRAM PRODUCTS FOR PROCESSING A DATA OBJECT IDENTIFICATION REQUEST IN A COMMUNICATION" which in turn is a continuation-in-part of and claims priority to: U.S. application Ser. No. 13/654,647 (published as US 2014-0112319 A1) filed Oct. 18, 2012 and entitled "METHODS, SYSTEMS, AND COMPUTER PROGRAM PRODUCTS FOR CONSTRAINING A DATA EXCHANGE REQUESTED IN A COMMUNICATION," U.S. application Ser. No. 13/716,156 (published as US 2014-0172912 A1) filed Dec. 16, 2012 and entitled "METHODS, SYSTEMS, AND COMPUTER PROGRAM PRODUCTS FOR PROCESSING A SEARCH QUERY EXCHANGED VIA A COMMUNICATIONS PROTOCOL," and U.S. application Ser. No. 13/716,159 (published as US 2014-0172998 A1) filed Dec. 16, 2012 and entitled "METHODS, SYSTEMS, AND COMPUTER PROGRAM PRODUCTS FOR BROWSING VIA A COMMUNICATIONS AGENT," where U.S. application Ser. No. 13/716,159 incorporates the following applications by reference:

application Ser. No. 13/716,156 (published as US 2014-0172912 A1) filed on 2012 Dec. 16, entitled "METHODS, SYSTEMS, AND PROGRAM PRODUCTS FOR PROCESSING A SEARCH QUERY VIA A COMMUNICATIONS PROTOCOL";

application Ser. No. 13/716,160 (published as US 2014-0172999 A1) filed on 2012 Dec. 16, entitled "METHODS, SYSTEMS, AND PROGRAM PRODUCTS FOR ACCESSING A SERVICE VIA A PROXY COMMUNICATIONS AGENT";

application Ser. No. 13/716,158 (published as US 2014-0173449 A1) filed on 2012 Dec. 16, entitled "METHODS, SYSTEMS, AND PROGRAM PRODUCTS FOR PROCESSING A REQUEST VIA A COMMUNICATIONS AGENT";

application Ser. No. 13/624,906 (published as US 2014-0089419 A1) filed on 2012 Sep. 22, entitled "METHODS, SYSTEMS, AND PROGRAM PRODUCTS FOR PROCESSING A DATA OBJECT REQUEST IN A COMMUNICATION";

application Ser. No. 13/626,635 (published as US 2014-0089421 A1) filed on 2012 Sep. 25, entitled "METHODS, SYSTEMS, AND PROGRAM PRODUCTS FOR SHARING A DATA OBJECT IN A DATA STORE VIA A COMMUNICATION";

application Ser. No. 13/647,144 (published as US 2014-0101554 A1) filed on 2012 Oct. 8, entitled "METHODS, SYSTEMS, AND PROGRAM PRODUCTS FOR EXCHANGING PRESENTATION DATA IN A COMMUNICATION";

application Ser. No. 13/624,940 (published as US 2014-0089420 A1) filed on 2012 Sep. 23, entitled "METHODS, SYSTEMS, AND PROGRAM PRODUCTS FOR PROCESSING A REFERENCE IN A COMMUNICATION TO A REMOTE DATA OBJECT"; and application Ser. No. 13/654,647 (published as US 2014-0112319 A1) filed on 2012 Oct. 18, entitled "METHODS, SYSTEMS, AND PROGRAM PRODUCTS FOR CONSTRAINING A DATA EXCHANGE REQUEST IN A COMMUNICATION", and where U.S. application Ser. No. 13/654,647 incorporates the following applications by reference:

application Ser. No. 12/833,014 (published as US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION;" and application Ser. No. 12/833,016 (published as US 2012-0011444 A1) filed on 2010 Jul. 9, entitled "METHODS, SYSTEMS, AND PROGRAM PRODUCTS FOR REFERENCING AN ATTACHMENT IN A COMMUNICATION".

The following applications are incorporated herein by reference:

U.S. application Ser. No. 13/716,159 (published as US 2014-0172998 A1) filed Dec. 16, 2012 and entitled "METHODS, SYSTEMS, AND COMPUTER PROGRAM PRODUCTS FOR BROWSING VIA A COMMUNICATIONS AGENT;"

application Ser. No. 13/716,156 (published as US 2014-0172912 A1) filed on 2012 Dec. 16, entitled "METHODS, SYSTEMS, AND PROGRAM PRODUCTS FOR PROCESSING A SEARCH QUERY VIA A COMMUNICATIONS PROTOCOL";

application Ser. No. 13/716,160 (published as US 2014-0172999 A1) filed on 2012 Dec. 16, entitled "METHODS, SYSTEMS, AND PROGRAM PRODUCTS FOR ACCESSING A SERVICE VIA A PROXY COMMUNICATIONS AGENT";

application Ser. No. 13/716,158 (published as US 2014-0173449 A1) filed on 2012 Dec. 16, entitled "METHODS, SYSTEMS, AND PROGRAM PRODUCTS FOR PROCESSING A REQUEST VIA A COMMUNICATIONS AGENT";

application Ser. No. 13/624,906 (published as US 2014-0089419 A1) filed on 2012 Sep. 22, entitled "METHODS, SYSTEMS, AND PROGRAM PRODUCTS FOR PROCESSING A DATA OBJECT REQUEST IN A COMMUNICATION";

application Ser. No. 13/626,635 (published as US 2014-0089421 A1) filed on 2012 Sep. 25, entitled "METHODS, SYSTEMS, AND PROGRAM PRODUCTS FOR SHARING A DATA OBJECT IN A DATA STORE VIA A COMMUNICATION";

application Ser. No. 13/647,144 (published as US 2014-0101554 A1) filed on 2012 Oct. 8, entitled "METHODS, SYSTEMS, AND PROGRAM PRODUCTS FOR EXCHANGING PRESENTATION DATA IN A COMMUNICATION";

application Ser. No. 13/624,940 (published as US 2014-0089420 A1) filed on 2012 Sep. 23, entitled "METHODS, SYSTEMS, AND PROGRAM PRODUCTS FOR PROCESSING A REFERENCE IN A COMMUNICATION TO A REMOTE DATA OBJECT";

application Ser. No. 13/654,647 (published as US 2014-0112319 A1) filed on 2012 Oct. 18, entitled "METHODS, SYSTEMS, AND PROGRAM PRODUCTS FOR CONSTRAINING A DATA EXCHANGE REQUEST IN A COMMUNICATION";

application Ser. No. 12/833,014 (published as US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION;" and application Ser. No. 12/833,016 (published as US 2012-0011444 A1) filed on 2010 Jul. 9, entitled "METHODS, SYSTEMS, AND PROGRAM PRODUCTS FOR REFERENCING AN ATTACHMENT IN A COMMUNICATION".

BACKGROUND

Web browsing and communications such as email, voice communications, and instant messages are tasks that user engage in by interacting with separate user interfaces. When a user selects a hyperlink that identifies a request in an email message, the email client opens a browser to send the request based on a URL identified by the hyperlink. This switching back and forth between applications with different user interfaces is not ideal. Further, a request sent by a browser is time restricted. That is, web browsers operate with time constraints in which a response must be received. Otherwise, the browser processes a non-response as an error. Many tasks do not require such time restrictions. Some tasks take relatively long periods of time. For example, a process of applying for a mortgage requires tasks that may take hours to days to be performed. Web browsers are not well-suited to provide a user interface for such tasks.

Accordingly, there exists a need for methods, systems, and computer program products for browsing via a communications agent.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a computer-implemented method is provided, comprising: creating at least a portion of an instant messaging application that is configured to cooperate with an apparatus, the instant messaging application, when executed, configured to cause a device to: display an instant messaging interface including a communicant message user interface element and a send user interface element, receive, from the apparatus and utilizing a communications agent on the device configured to receive incoming messages addressed to a communicant identifier associated with a user of the instant messaging application, one or more user interface elements including a first button, in response to the receipt, from the apparatus and utilizing the communications agent on the device configured to receive the incoming messages addressed to the communicant identifier associated with the user of the instant messaging application, of the one or more user interface elements including the first button: display, via the communicant message user interface element of the instant messaging interface, the one or more user interface elements including the first button, receive, via the communicant message user interface element of the instant messaging interface, an indication of a selection on the first button displayed via the communicant message user interface element of the instant messaging interface, in response to the receipt, via the communicant message user interface element of the instant messaging interface, of the indication of the selection on the first button displayed via the communicant message user interface element of the instant messaging interface: generate a first request corresponding to the first button displayed via the communicant message user interface element of the instant messaging interface, in response to the generation of the first request corresponding to the first button displayed via the communicant message user interface element of the instant messaging interface: send, to the apparatus and utilizing the communications agent on the device configured to send outgoing messages addressed from the communicant identifier associated with the user of the instant messaging application, the first request corresponding to the first button displayed via the communicant message user interface element of the instant messaging interface, after sending, to the apparatus and utilizing the communications agent on the device configured to send the outgoing messages addressed from the communicant identifier associated with the user of the instant messaging application, the first request corresponding to the first button displayed via the communicant message user interface element of the instant messaging interface: receive, from the apparatus and utilizing the communications agent on the device configured to receive the incoming messages addressed to the communicant identifier associated with the user of the instant messaging application, a first response including at least one first image and a second button, in response to the receipt, from the apparatus and utilizing the communications agent on the device configured to receive the incoming messages addressed to the communicant identifier associated with the user of the instant messaging application, of the first response including the at least one first image: update the communicant message user interface element of the instant messaging interface to include, with the one or more user interface elements including the first button displayed via the communicant message user interface element of the instant messaging interface: the at least one first image and the second button, receive, via the communicant message user interface element of the instant messaging interface, an indication of a selection on the second button displayed via the communicant message user interface element of the instant messaging interface, in response to the receipt, via the communicant message user interface element of the instant messaging interface, of the indication of the selection on the second button: generate a second request corresponding to the second button displayed via the communicant message user interface element of the instant messaging interface, in response to the generation of the second request corresponding to the second button displayed via the communicant message user interface element of the instant messaging interface: send, to the apparatus and utilizing the communications agent on the device configured to send the outgoing messages addressed from the communicant identifier associated with the user of the instant messaging application, the second request corresponding to the second button displayed via the communicant message user interface element of the instant messaging interface, after sending, to the apparatus and utilizing the communications agent on the device configured to send the outgoing messages addressed from the communicant identifier associated with the user of the instant messaging application, the second request corresponding to the second button displayed via the communicant message user interface element of the instant messaging interface: receive, from the apparatus and utilizing the communications agent on the device configured to receive the incoming messages addressed to the communicant identifier associated with the user of the instant messaging application, a second response including at least one second image, and in response to the receipt, from the apparatus and utilizing the communications agent on the device configured to receive the incoming messages addressed to the communicant identifier associated with the user of the instant messaging application, of the second response including the at least one second image: update the communicant message user interface element of the instant messaging interface to include, with the one or more user interface elements including the first button displayed via the communicant message user interface element of the instant messaging interface, and with the at least one first image and the second button displayed via the communicant message user interface element of the instant messaging interface: the at least one second image; and causing storage of the at least portion of the instant messaging application.

In other embodiments, other methods and/or non-transitory media are provided which may omit one or more of the features disclosed in the above embodiment.

In other embodiments, methods and systems are described for browsing via a communications agent. In one aspect, the method includes receiving, from a first user, via an input detected by an input device, by a first communications agent operating in a first execution environment, request information identifying a first universal resource identifier (URI). The method further includes generating, based on the first URI, by the first communications agent, a communications request. The method still further includes sending, in response to receiving the request information by the first communications agent via a network in a communication, the communications request. The method also includes receiving, by the first execution environment in response to the sending of the communications request, a communications response. The method additionally includes, performing at least one the preceding actions comprising the method includes execution of an instruction by a processor.

Also, a system for browsing via a communications agent is described that includes at least one processor; and logic encoded in at least one data storage media for execution by the at least one processor that when executed is operable for and/or otherwise included in receiving, from a first user, via an input detected by an input device, by a first communications agent operating in a first execution environment, request information identifying a first universal resource identifier (URI); generating, based on the first URI, by the first communications agent, a communications request; sending, in response to receiving the request information by the first communications agent via a network in a communication, the communications request; and receiving, by the first execution environment in response to the sending of the communications request, a communications response.

Further, a system for browsing via a communications agent is described. The system includes a processor that executes an instruction included in at least one of a URI director component, a request constructor component, a com-out component, and a response director component during operation of the system. During operation of the system the URI director component is operable for and/or otherwise is included in receiving, from a first user, via an input detected by an input device, by a first communications agent operating in a first execution environment, request information identifying a first universal resource identifier (URI); the request constructor component is operable for and/or otherwise is included in generating, based on the first URI, by the first communications agent, a communications request; the com-out component is operable for and/or otherwise is included in sending, in response to receiving the request information by the first communications agent via a network in a communication, the communications request; and the response director component is operable for and/or otherwise is included in receiving, by the first execution environment in response to the sending of the communications request, a communications response.

In another aspect, a method includes receiving, by a communications service via a network, a communications request from a communications agent in a communication representing a first user and operating in a first execution environment, wherein the communications request identifies a first universal resource identifier (URI). The method further includes processing, based on the first URI, the communications request. The method still further includes generating, based on the processing, a communications response. The method additionally includes sending, in response to receiving the communications request, the communications response to an execution environment including an agent representing the first user. Performing at least one the preceding actions comprising the method includes execution of an instruction by a processor.

Also, a system for browsing via a communications agent is described that includes at least one processor; and logic encoded in at least one data storage media for execution by the at least one processor that when executed is operable for and/or otherwise included in receiving, by a communications service via a network, a communications request from a communications agent in a communication representing a first user and operating in a first execution environment, wherein the communications request identifies a first universal resource identifier (URI); processing, based on the first URI, the communications request; generating, based on the processing, a communications response; and sending, in response to receiving the communications request, the communications response to an execution environment including an agent representing the first user.

Further, a system for browsing via a communications agent is described. The system includes a processor that executes an instruction included in at least one of a request-in component, a command handler component, a response generator component, and a response-out component during operation of the system. During operation of the system the request-in component is operable for and/or otherwise is included in receiving, by a communications service via a network, a communications request from a communications agent in a communication representing a first user and operating in a first execution environment, wherein the communications request identifies a first universal resource identifier (URI); the command handler component is operable for and/or otherwise is included in processing, based on the first URI, the communications request; the response generator component is operable for and/or otherwise is included in generating, based on the processing, a communications response; and the response-out component is operable for and/or otherwise is included in sending, in response to receiving the communications request, the communications response to an execution environment including an agent representing the first user.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 8C illustrates another exemplary portion of a communication according to an aspect of the subject matter described herein.

DETAILED DESCRIPTION

Figure 1:
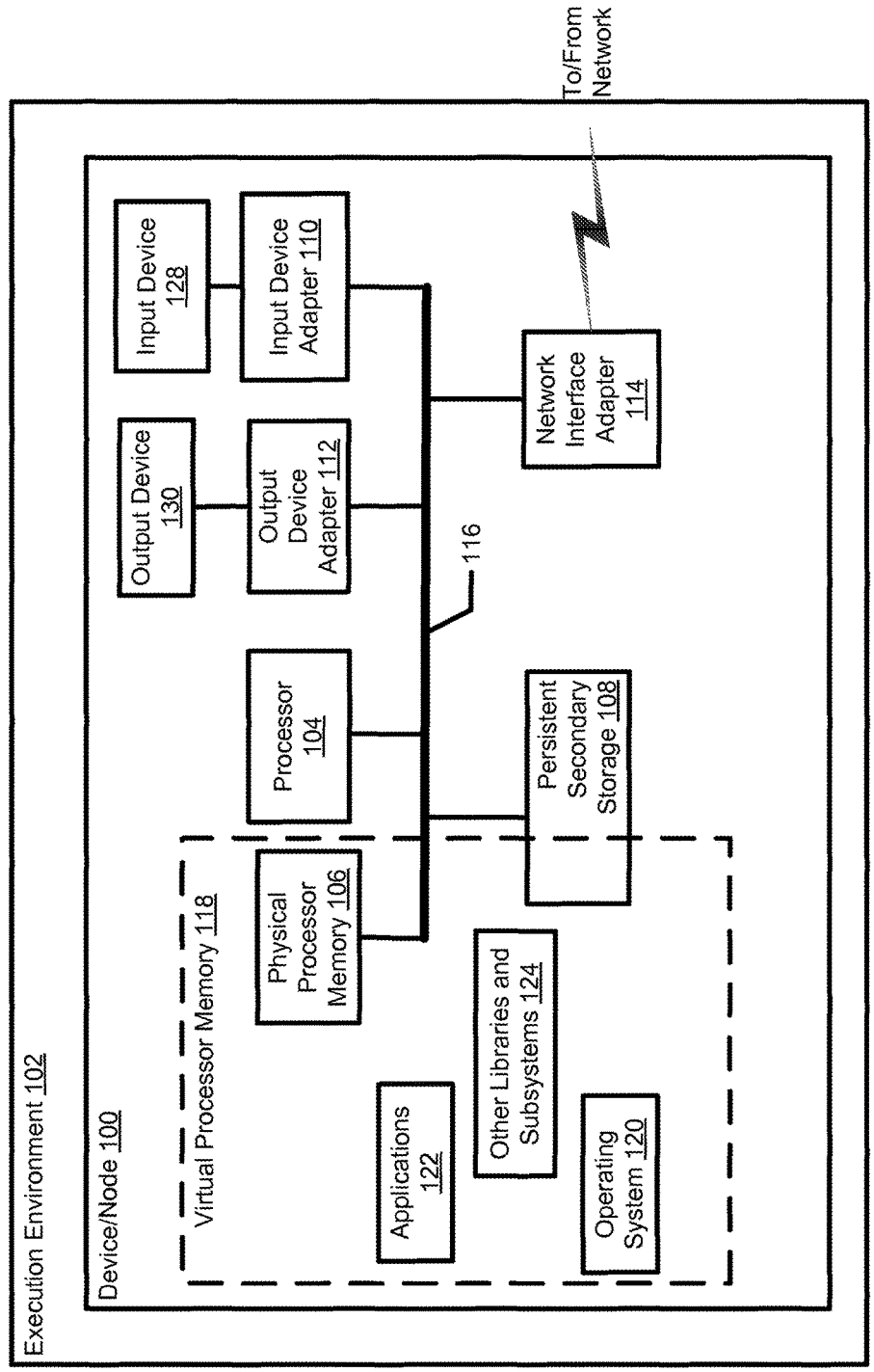
FIG. 1 is a block diagram illustrating an exemplary execution environment in which the subject matter may be implemented that includes and/or otherwise is provided by a hardware device.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided", "received", "identified", "interoperated" and similar terms and their variants.

As used herein, any reference to an entity "in" an association is equivalent to describing the object as "identified" by the association, unless explicitly indicated otherwise.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety. In case of conflict, the present disclosure, including definitions, will control. In addition, the materials, methods, and examples are illustrative only and not intended to be limiting.

An exemplary device included in an execution environment that may be programmed, adapted, modified, and/or otherwise configured according to the subject matter is illustrated in FIG. 1. An "execution environment", as used herein, is an arrangement of hardware and, in some aspects, software that may be further modified, transformed, and/or otherwise configured to include and/or otherwise host an arrangement of components to perform a method of the subject matter described herein. An execution environment includes and/or is otherwise provided by one or more devices. The execution environment is said to be the execution environment "of" the device and/or devices. An execution environment may be and/or may include a virtual execution environment including software components operating in a host execution environment. Exemplary devices included in and/or otherwise providing suitable execution environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a network server, or any other type and/or form of computing, telecommunications or media device that is suitable to perform the subject matter described herein. Those skilled in the art will understand that the components illustrated in FIG. 1 are exemplary and may vary by particular execution environment.

FIG. 1 illustrates a hardware device 100 included in an execution environment 102. FIG. 1 illustrates that execution environment 102 includes a processor 104, such as one or more microprocessors; a physical processor memory 106 including storage locations identified by addresses in a physical memory address space of processor 104; a persistent secondary storage 108, such as one or more hard drives and/or flash storage media; an input device adapter 110, such as a key or keypad hardware, a keyboard adapter, and/or a mouse adapter; an output device adapter 112, such as a display and/or an audio adapter to present information to a user; a network interface component, illustrated by a network interface adapter 114, to communicate via a network such as a LAN and/or WAN; and a mechanism that operatively couples elements 104-114, illustrated as a bus 116. Elements 104-114 may be operatively coupled by various means. Bus 116 may comprise any type of bus architecture, including a memory bus, a peripheral bus, a local bus, and/or a switching fabric.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs). Processor 104 may access instructions and data via one or more memory address spaces in addition to the physical memory address space. A memory address space includes addresses identifying locations in a processor memory. The addresses in a memory address space are included in defining a processor memory. Processor 104 may have more than one processor memory. Thus, processor 104 may have more than one memory address space. Processor 104 may access a location in a processor memory by processing an address identifying the location. The processed address may be identified by an operand of an instruction and/or may be identified by a register and/or other portion of processor 104.

FIG. 1 illustrates a virtual processor memory 118 spanning at least part of physical processor memory 106 and may span at least part of persistent secondary storage 108. Virtual memory addresses in a memory address space may be mapped to physical memory addresses identifying locations in physical processor memory 106. An address space including addresses that identify locations in a virtual processor memory is referred to as a "virtual memory address space"; its addresses are referred to as "virtual memory addresses"; and its processor memory is referred to as a "virtual processor memory" or "virtual memory". The term "processor memory" may refer to physical processor memory, such as processor memory 106, and/or may refer to virtual processor memory, such as virtual processor memory 118, depending on the context in which the term is used.

Physical processor memory 106 may include various types of memory technologies. Exemplary memory technologies include static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDR™ DRAM. Physical processor memory 106 may include volatile memory as illustrated in the previous sentence and/or may include non-volatile memory such as non-volatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, program components, and other data.

Execution environment 102 may include software components stored in persistent secondary storage 108, in remote storage accessible via a network, and/or in a processor memory. FIG. 1 illustrates execution environment 102 including an operating system 120, one or more applications 122, and other program code and/or data components illustrated by other libraries and subsystems 124. In an aspect, some or all software components may be stored in locations accessible to processor 104 in a shared memory address space shared by the software components. The software components accessed via the shared memory address space may be stored in a shared processor memory defined by the shared memory address space. In another aspect, a first software component may be stored in one or more locations accessed by processor 104 in a first address space and a second software component may be stored in one or more locations accessed by processor 104 in a second address space. The first software component is stored in a first processor memory defined by the first address space and the second software component is stored in a second processor memory defined by the second address space.

Software components typically include instructions executed by processor 104 in a computing context referred to as a "process". A process may include one or more "threads". A "thread" includes a sequence of instructions executed by processor 104 in a computing sub-context of a process. The terms "thread" and "process" may be used interchangeably herein when a process includes only one thread.

Execution environment 102 may receive user-provided information via one or more input devices illustrated by an input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding network interfaces such as a serial port, a parallel port, and/or a universal serial bus (USB) port. Input device adapter 110 may receive input and provide a representation to bus 116 to be received by processor 104, physical processor memory 106, and/or other components included in execution environment 102.

An output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. FIG. 1 illustrates network interface adapter (NIA) 114 as a network interface component included in execution environment 102 to operatively couple device 100 to a network. A network interface component includes a network interface hardware (NIH) component and optionally a network interface software (NIS) component.

Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component to operatively couple the device to a network. Further, the terms "device" and "node" used herein refer to one or more devices and nodes, respectively, providing and/or otherwise included in an execution environment unless clearly indicated otherwise.

The user-detectable outputs of a user interface are generically referred to herein as "user interface elements" or abbreviated as "UI elements". More specifically, visual outputs of a user interface are referred to herein as "visual interface elements". A visual interface element may be a visual output of a graphical user interface (GUI). Exemplary visual interface elements include icons, image data, graphical drawings, font characters, windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes, and radio buttons. An application interface may include one or more of the elements listed. Those skilled in the art will understand that this list is not exhaustive. The terms "visual representation", "visual output", and "visual interface element" are used interchangeably in this document. Other types of UI elements include audio outputs referred to as "audio interface elements", tactile outputs referred to as "tactile interface elements", and the like.

A "user interface (UI) element handler" component, as the term is used herein, refers to a component that operates to send information representing a program entity to present a user-detectable representation of the program entity by an output device, such as a display. A "program entity" is an object included in and/or otherwise processed by an application or executable. The user-detectable representation is presented based on the sent information. Information that represents a program entity to present a user detectable representation of the program entity by an output device is referred to herein as "presentation information". Presentation information may include and/or may otherwise identify data in one or more formats. Exemplary formats include image formats such as raw pixel data, JPEG, video formats such as MP4, markup language data such as hypertext markup language (HTML) and other XML-based markup, a bit map, and/or instructions such as those defined by various script languages, byte code, and/or machine code. For example, a web page received by a browser or more generally a user agent from a remote application provider may include HTML, ECMAScript, and/or byte code to present one or more UI elements included in a user interface of the remote application. Components that send information representing one or more program entities to present particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided to store and/or otherwise represent presentation information, which may include audio, visual, tactile, and/or other sensory data for presentation by and/or on an output device. For example, a memory buffer to store an image and/or text string may be a presentation space as sensory information for a user. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

An "interaction", as the term is used herein, refers to any activity including a user and an object where the object is a source of sensory data detected by the user and/or the user is a source of input for the object. An interaction, as indicated, may include the object as a target of input from the user. The input from the user may be provided intentionally or unintentionally by the user. For example, a rock being held in the hand of a user is a target of input, both tactile and energy input, from the user. A portable electronic device is a type of object. In another example, a user looking at a portable electronic device is receiving sensory data from the portable electronic device whether the device is presenting an output via an output device or not. The user manipulating an input component of the portable electronic device exemplifies the device, as an input target, receiving input from the user. Note that the user in providing input is receiving sensory information from the portable electronic. An interaction may include an input from the user that is detected and/or otherwise sensed by the device. An interaction may include sensory information that is received by a user included in the interaction that is presented by an output device included in the interaction.

As used herein "interaction information" refers to any information that identifies an interaction and/or otherwise provides data about an interaction between a user and an object, such as a portable electronic device. Exemplary interaction information may identify a user input for the object, a user-detectable output presented by an output device of the object, a user-detectable attribute of the object, an operation performed by the object in response to a user, an operation performed by the object to present and/or otherwise produce a user-detectable output, and/or a measure of interaction.

Interaction information for one object may include and/or otherwise identify interaction information for another object. For example, a motion detector may detect a user's head turn in the direction of a display of a portable electronic device. Interaction information indicating that the user's head is facing the display may be received and/or used as interaction information for the portable electronic device indicating the user is receiving visual input from the display. The interaction information may serve to indicate a lack of user interaction with one or more other objects in directions from the user different than the detected direction, such as a person approaching the user from behind the user. Thus the interaction information may serve as interaction information for one or more different objects.

As used herein, the terms "program" and "executable" refer to any data representation that may be translated into a set of machine code instructions and may optionally include associated program data. The terms are used interchangeably herein.

Program representations other than machine code include object code, byte code, and source code. Object code includes a set of instructions and/or data elements that either are prepared to link prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code. A program and/or executable may include one or more components, referred to herein as a "program component", "software component", and/or "executable component". As used herein, the terms "application", and "service" may be realized in one or more program components and/or in one or more hardware components.

As used herein, the term "network protocol" refers to a set of rules, conventions and/or schemas that govern how nodes exchange information over a network. The set may define, for example, a convention and/or a data structure. The term "network path" as used herein refers to a sequence of nodes in a network that are communicatively coupled to transmit data in one or more data units of a network protocol between a pair of nodes in the network.

A "data unit", as the term is used herein, is an entity specified according to a network protocol to transmit data between a pair of nodes in a network path to send the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node. Various address types are specified defining a vocabulary for one or more address portions of an IP data unit. The terms "data unit", "frame", "data packet", and "packet" are used interchangeably herein. One or more data units of a first network protocol may transmit a "message" of second network protocol.

For example, one or more data units of the IP protocol may include a TCP message. In another example, one or more TCP data units may transmit an HTTP message.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the protocol. For example, 192.168.1.1 is an IP protocol address represented in a human readable format that may be represented in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is included in a node and is accessible via a network via a network interface, a protocol address identifies a node and identifies a network interface of the node. A network interface may include one or more NICs operatively coupled to a network.

Those skilled in the art will understand upon reading the descriptions herein that the subject matter disclosed herein is not restricted to the network protocols described and/or their corresponding OSI layers.

As used herein, the term "communication" refers to data exchanged via a network protocol along with an identifier that identifies a user as a sender of the data and/or as a receiver of the data. The identifier is included in a data unit of the network protocol and/or in a message transported by the network protocol. The network protocol is referred to herein as a "communications protocol". The sender is referred to herein as a "contactor". The receiver is referred to herein as a "contactee". The terms "contactor" and "contactee" identify roles of "communicants" in a communication. The contactor and the contactee are each a "communicant" in the communication. An identifier that identifies a communicant in a communication is referred herein as a "communicant identifier". The terms "communicant identifier" and "communicant address" are used interchangeably herein. A communicant identifier that identifies a communicant in a communication exchanged via a communications protocol is said to be in an identifier space or an address space of the communications protocol. The data in a communication may include text data, audio data, image data, and/or a program component.

A communications protocol defines one or more rules, conventions, and/or vocabularies for constructing, transmitting, receiving and/or otherwise processing a data unit of and/or a message transported by the communications protocol. Exemplary communications protocols include a simple mail transfer protocol (SMTP), a post office protocol (POP), an instant message (IM) protocol, a short message service (SMS) protocol, a multimedia message service (MMS) protocol, a Voice over IP (VOIP) protocol. Any network protocol that specifies a data unit and/or transports a message addressed with a communicant identifier is or may operate as a communications protocol. In a communication, data may be exchanged via one or more communications protocols. Exemplary communicant identifiers include email addresses, phone numbers, multi-media communicant identifiers such as SKYPE® IDs, instant messaging identifiers, MMS identifiers, and SMS identifiers.

A user in the role of a communicant interacts with a communications agent to receive data addressed to the user in a communication. Alternatively or additionally, a user in the role of a communicant interacts with a communications agent to send data addressed to another communicant in a communication. More generally, the term "communications agent" refers to a component or application that operates in an execution environment to receive, on behalf of a contactee, a communicant message address to the contactee by a communicant identifier in the communication. The communications agent interacts with the contactee communicant in presenting and/or otherwise delivering the communicant message. Alternative or additionally, a communications agent operates in an execution environment to send, on behalf of a contactor, a communicant message in a communication addressed to a contactee by a communicant identifier in the communication. A communications agent that operates on behalf of a communicant in the role of a contactor and/or a contactee as described above is said, herein, to "represent" the communicant.

A "communicant message" data spoken, written, and/or acted by a contactor for a contactee. The data is received by a communications agent representing the contactor and is further received and/or to be received in a communication by a communications agent to present via an output device to the contactee identified in the communication by a communicant identifier. Examples of communicant messages include text written by a contactee in an email and/or an instant message and a spoken message by a contactee included in an audio communication by a VoIP client. To be clear attachments, data unit headers, message headers, communication session control data, and/or connection data for setup and management of a communication are not communicant messages as defined herein.

The term "communicant alias" as used herein refers to an identifier of a communicant in a communication where the communicant alias is not a communicant identifier in an address space of a communication protocol via which the communication is exchanged.

The term "attachment" as used herein refers to data, that is not a communicant message, exchanged in a communication from a sending communications agent and/or communications service to a recipient communications agent and/or communications service. An attachment may be, for example, a copy of a file stored and/or otherwise represented in a file system and/or in another data store in an execution environment that includes a communications agent included in exchanging the attachment in a communication. A resource sent as an attachment is data that is typically not presented "inline" in a communicant message. Email attachments are perhaps the most widely known attachments included in communications. An email attachment is a file or other data resource sent in a portion of an email separate from a communicant message portion. As defined, other communicant messages may be sent in other types of communications along with one or more attachments.

A "communications request", as the term is user herein, refers to request sent by a communications agent via a communications protocol. A "communications response", as the term is user herein, refers to any response corresponding to a communications request. A communications response may be transmitted via the same communications protocol as its corresponding communications request, a different communications protocol, a web protocol, and/or via any other suitable network protocol. A "communications service", as the term is used herein, refers to a recipient of a communications request that is included in performing the request. Performing the request may include sending a service request based on the communications request to a service application included in performing the request. A communications service and/or a service application included in performing a communications request may generate a communications response to the request.

"Service application", as the term is used herein, refers to any application that provides access to a resource. "Resource", as the term is user herein, refers to a data entity, a hardware component, a program component, and/or service. A service request is a request to a service application to get, create, modify, delete, move, and/or invoke a resource. A response to a service request is referred to as a service response. Data in a service response is a resource. A communications request is a type of service request.

A "web protocol", as the term is used herein, refers to any version of a hypertext transfer protocol (HTTP) and/or any version of a HTTP secure (HTTPS) protocol. A "user agent", as the term is used herein, refers to a client which initiates a request via a web protocol. Examples include web browsers, HTML editors, spiders (web-traversing robots), or other end user tools. A "web request", as the term is used herein, refers to a request initiated by a user agent. A "web service", as the term is used herein, refers to a recipient of a web request. A web service generates a response to the request. A "web response", as the term is used herein, refers to any response that corresponds to a web request. A web response may be transmitted via the same web protocol as its corresponding web request, a different web protocol, via a communications protocol, and/or via any other suitable network protocol. A web request is a type of service request.

A "service provider", as the term is used herein, refers to any entity that owns, maintains, and/or otherwise provides a web service, communications service, and/or other network accessible service application. The term "service provider system" is used interchangeably with services and facilities that host a web service and/or other service application of a service provider. For example, a service provider system may include a server farm, a content delivery network, a database, a firewall, etc.

Figure 2A:
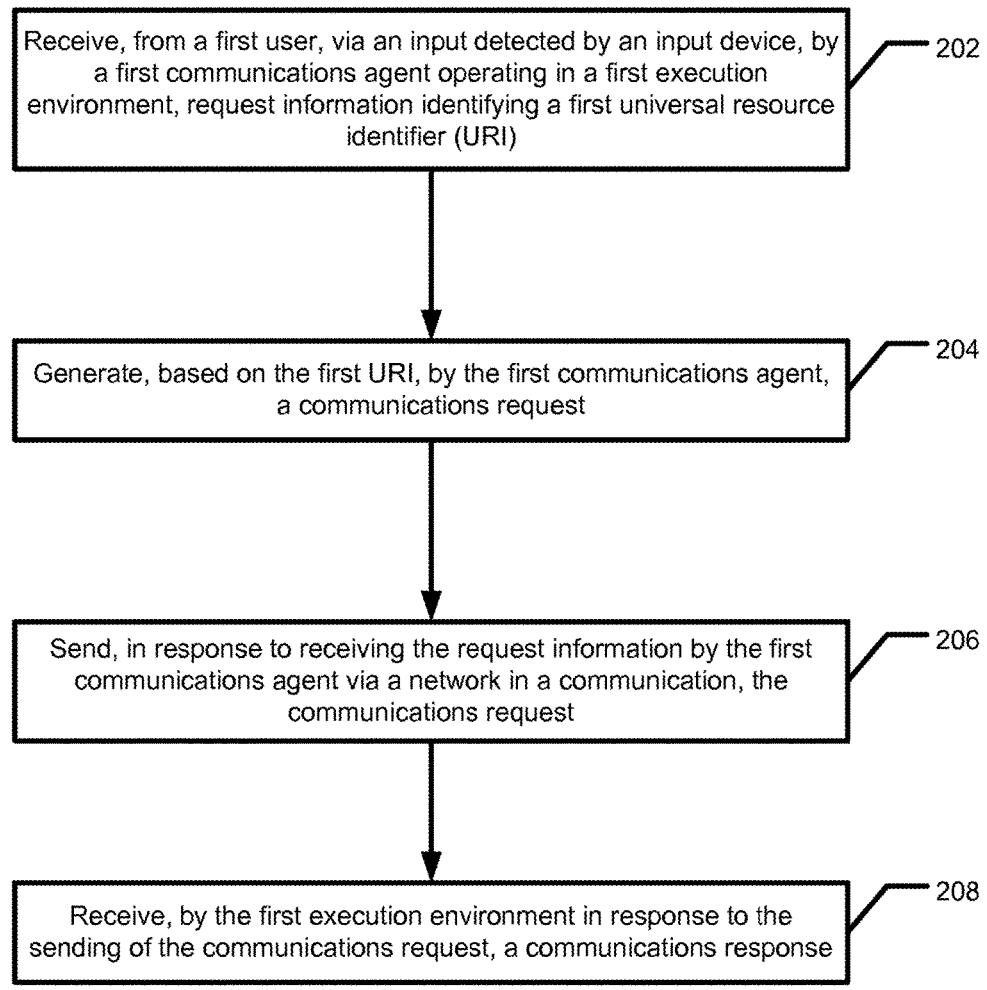
FIG. 2A is a flow diagram illustrating a method for browsing via a communications agent according to an aspect of the subject matter described herein.
Figure 2B:
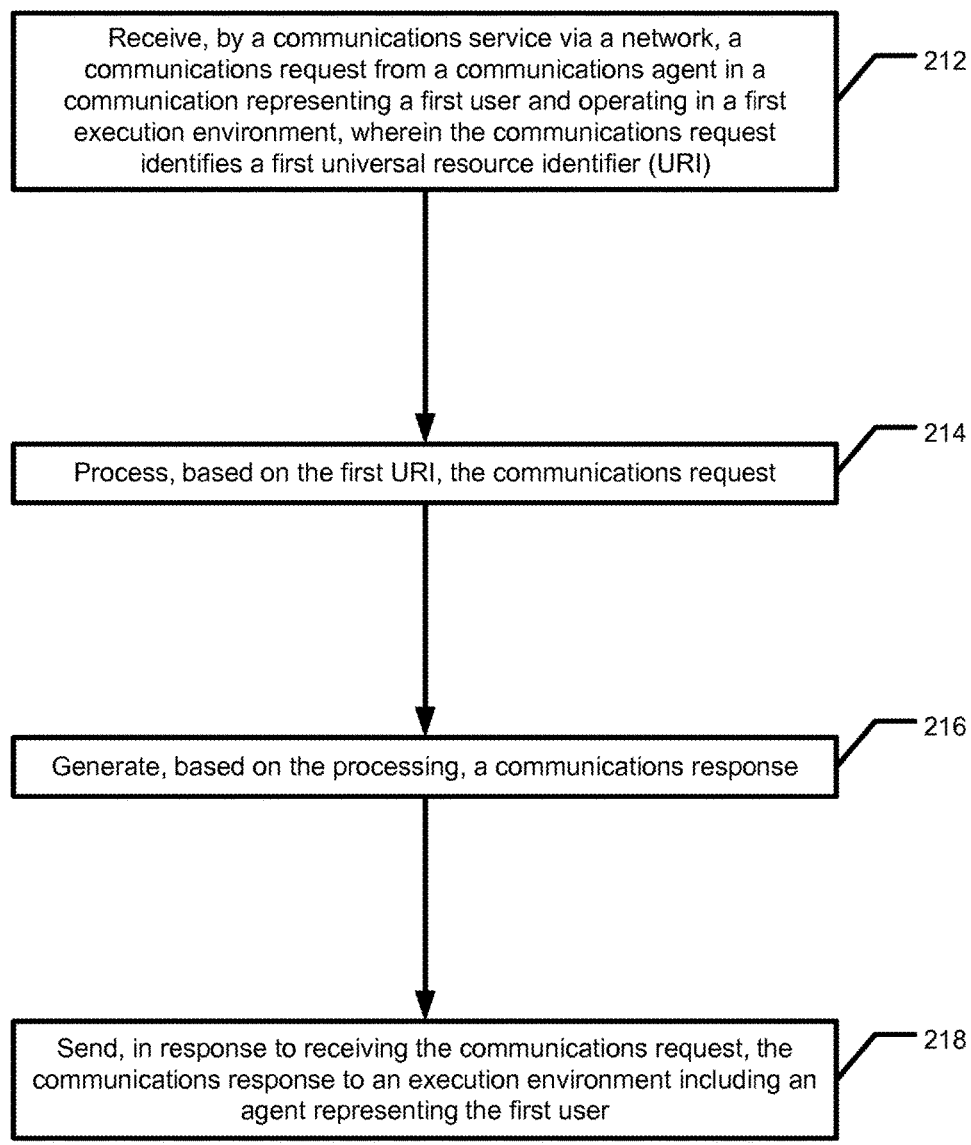
FIG. 2B is a flow diagram illustrating a method for browsing via a communications agent according to an aspect of the subject matter described herein.
Figure 3A:
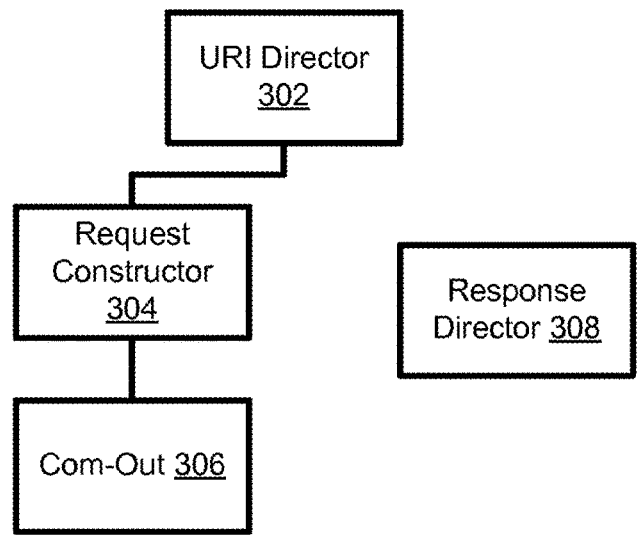
FIG. 3A is a block diagram illustrating an arrangement of components for browsing via a communications agent according to another aspect of the subject matter described herein.
Figure 3B:
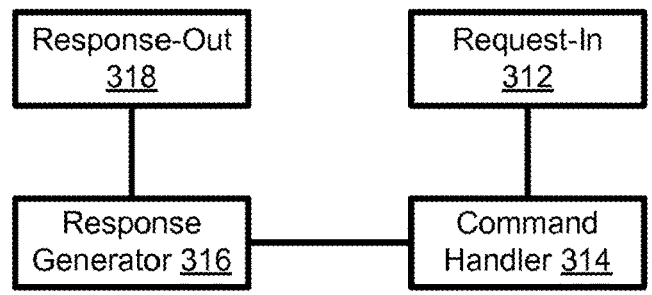
FIG. 3B is a block diagram illustrating an arrangement of components for browsing via a communications agent according to another aspect of the subject matter described herein.

FIG. 3A illustrates an arrangement of components in a system that operates in an execution environment, such as execution environment 102 in FIG. 1. The arrangement of components in the system operates to perform the method illustrated in FIG. 2A. The system illustrated includes a URI director component 302, a request constructor component 304, a com-out component 306, and a response director component 308. A suitable execution environment includes a processor, such as processor 104, to process an instruction in at least one of the URI director component, the request constructor component, the com-out component, and the response director component. FIG. 3B illustrates an arrangement of components in a system that operates to perform the method illustrated in FIG. 2B. The system illustrated includes a request-in component 312, a command handler component 314, a response generator component 316, and a response-out component 318. A suitable execution environment includes a processor, such as processor 104, to process an instruction in at least one of the request-in component, the command handler component, the response generator component, and the response-out component.

Some components, illustrated in the drawings are identified by numbers with an alphanumeric suffix. A component may be referred to generically in the singular or the plural by dropping a suffix of a portion thereof of the component's identifier. For example, execution environments; such as requesting execution environment 401a, access execution environment 401b, service execution environment 401c, and their adaptations and analogs; are referred to herein generically as an execution environment 401 or execution environments 401 when describing more than one. Other components identified with an alphanumeric suffix may be referred to generically or as a group in a similar manner.

Figure 4A:
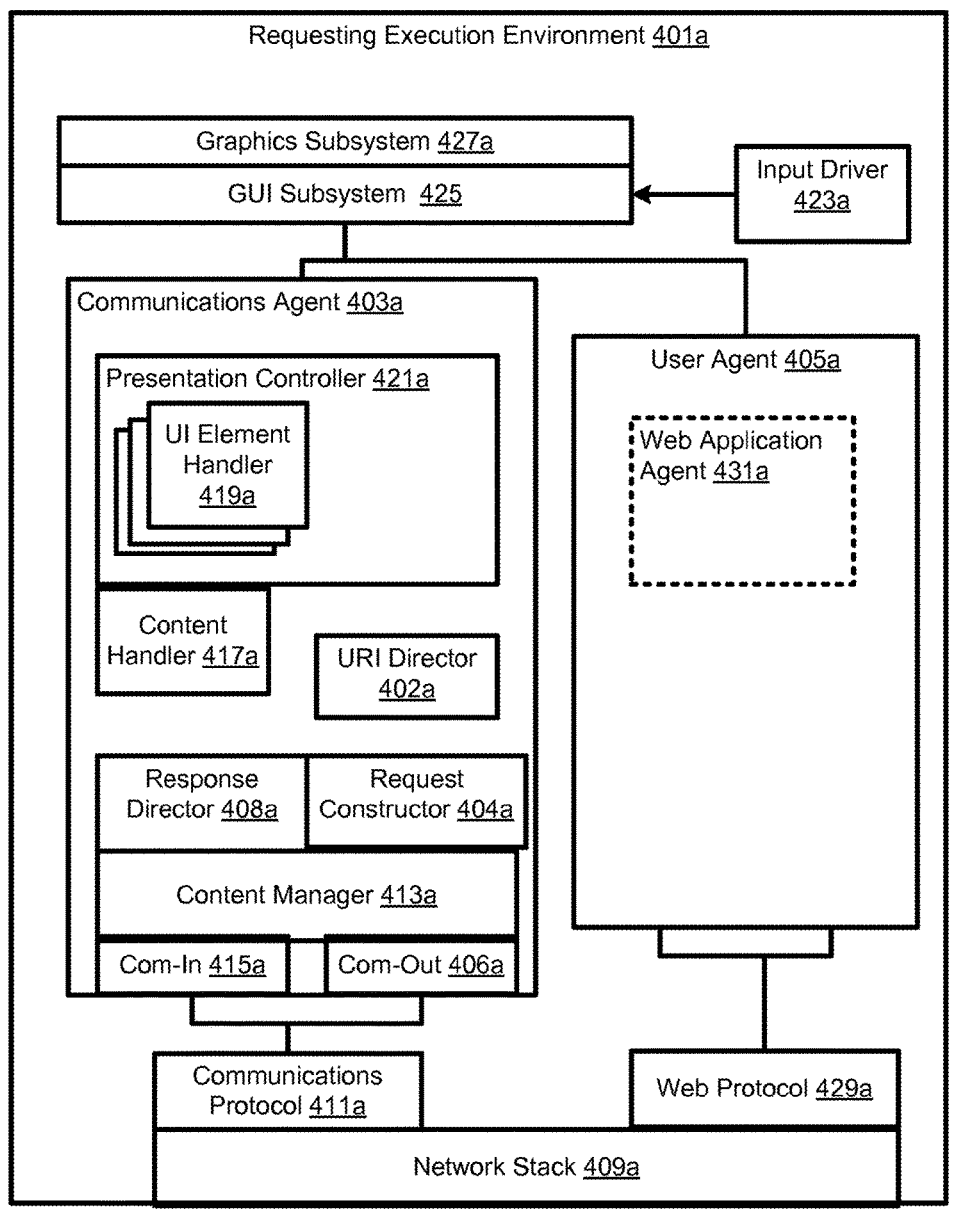
FIG. 4A is a block diagram illustrating an arrangement of components for browsing via a communications agent according to another aspect of the subject matter described herein.
Figure 4B:
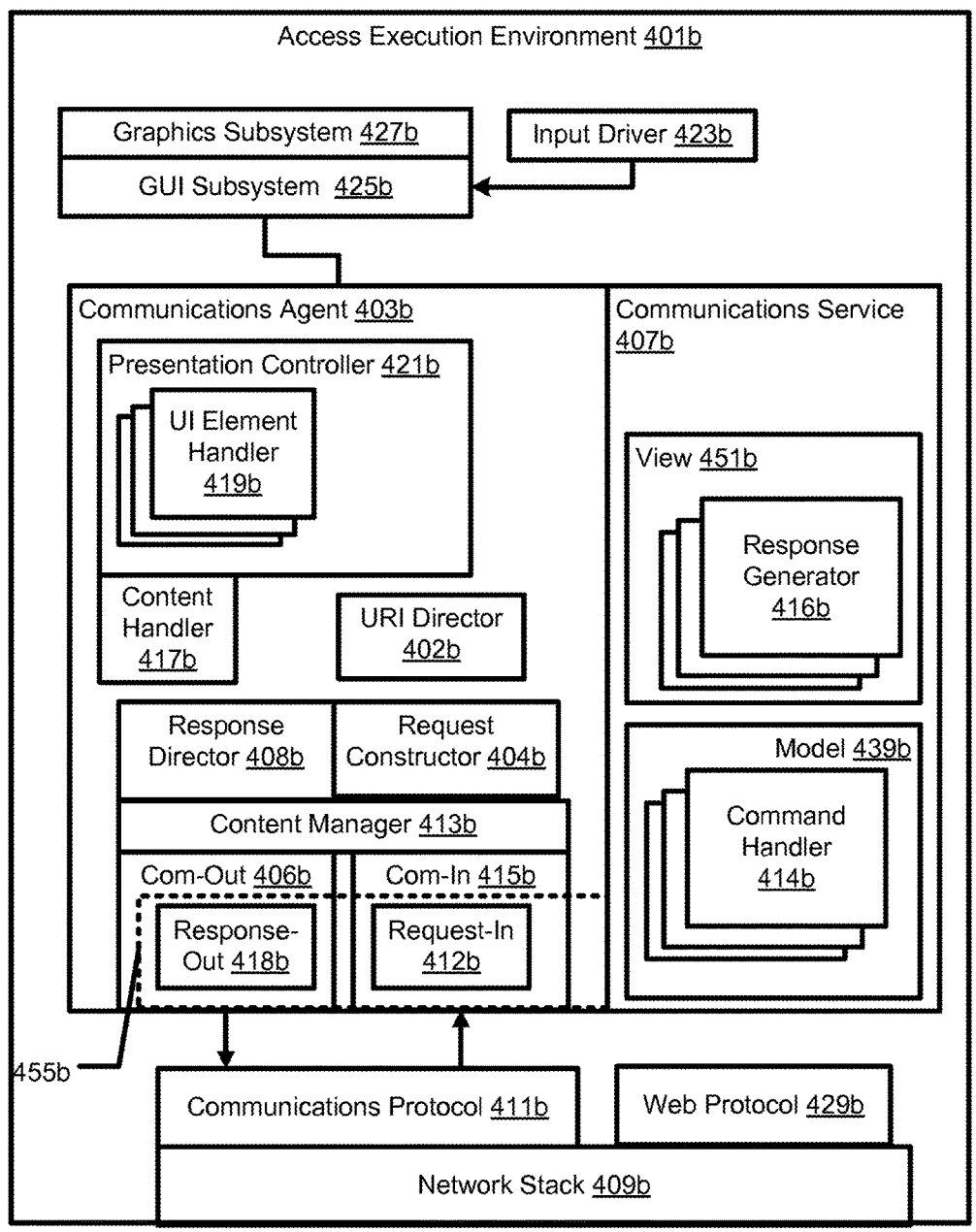
FIG. 4B is a block diagram illustrating an arrangement of components for browsing via a communications agent according to another aspect of the subject matter described herein.
Figure 4C:
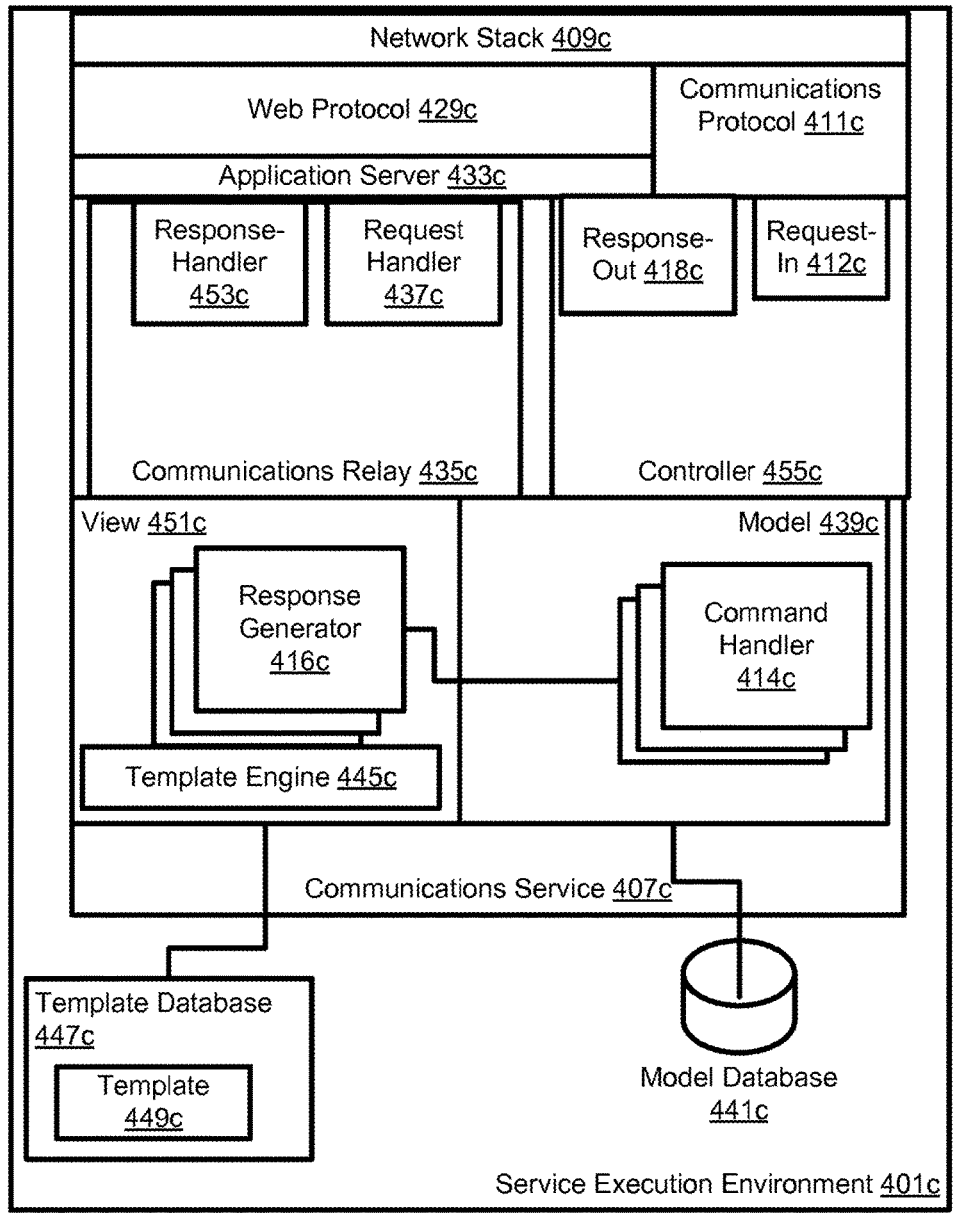
FIG. 4C is a block diagram illustrating an arrangement of components for browsing via a communications agent according to another aspect of the subject matter described herein.

Some or all of the exemplary components illustrated in FIG. 3A and in FIG. 3B, their adaptations, and/or their analogs may operate in a number of execution environments to perform the method illustrated in FIG. 2A and/or the method illustrated in FIG. 2B. FIG. 4A is a block diagram illustrating the components of FIG. 3A and/or analogs of the components of FIG. 3A that operate in a first execution environment referred to herein for illustrative purposes as a requesting execution environment 401a to perform the method illustrated in FIG. 2A. FIG. 4B is a block diagram illustrating the components of FIG. 3B and/or analogs of the components of FIG. 3B that operate in a second execution environment referred to herein for illustrative purposes as an access execution environment 401b to perform the method illustrated in FIG. 2B. FIG. 4C is a block diagram illustrating the components of FIG. 3B and/or analogs of the components of FIG. 3B that operate in a third execution environment referred to herein for illustrative purposes as a service execution environment 401c to perform the method illustrated in FIG. 2B.

Each execution environment 401 in FIGS. 4A-C is included in and/or otherwise is provided by one or more nodes. FIG. 1 illustrates key components of an exemplary device that may at least partially provide and/or otherwise may be included in an execution environment. The components illustrated in FIGS. 4A-C may be included in or may otherwise be combined with the components of FIG. 1 to create a variety of arrangements of components according to the subject matter described herein.

As stated, the various adaptations of the arrangement in FIG. 3A as well as the various adaptations of the arrangement in FIG. 3B illustrated and described herein are not exhaustive. For example, those skilled in the art will see, based on the description herein, that arrangements of components to perform the method illustrated in FIG. 2A and the method illustrated in FIG. 2B may each be distributed across more than one node and/or execution environment. For example, such an arrangement may operate at least partially in a browser or a user agent in one node and at least partially in a server in another node interoperating via a network.

Figure 5:
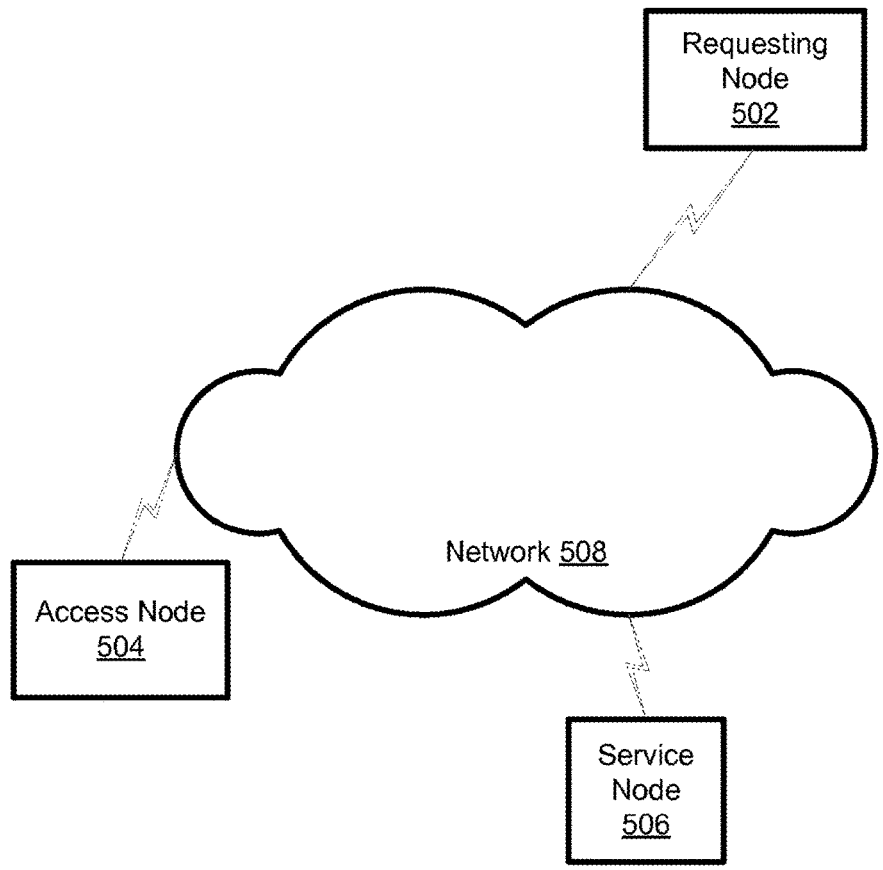
FIG. 5 is a network diagram illustrating a system for browsing via a communications agent according to another aspect of the subject matter described herein.

FIG. 5 illustrates a first node referred to herein for illustrative purposes as a requesting node 502, a second node referred to herein for illustrative purposes as an access node 504, and a third node referred to herein for illustrative purposes as a service node 506 as exemplary devices connected to a network 508. Each node may be included in and/or otherwise may provide an instance, adaptation, and/or analog of an execution environment 401 in any of FIGS. 4A-C. Requesting execution environment 401a may include and/or may otherwise be provided at least in part by requesting node 502. Access execution environment 401b may include and/or may otherwise be provided at least in part by access node 504. Service execution environment 401c may include and/or may otherwise be provided at least in part by service node 506.

Requesting execution environment 401a of requesting node 502 and access execution environment 401b of access node 504 are operatively coupled via respective network interface components and network 508. Access execution environment 401b of access node 504 and service execution environment 401c of service node 506 are also operatively coupled via respective network interface components. Requesting execution environment 401a of requesting node 502 and service execution environment 401c of service node 506 are operatively coupled via respective network interface components and network 508.

FIGS. 4A-C illustrate various applications in respective execution environments 401. FIG. 4A illustrates an adaptation of the arrangement of components in FIG. 3A in a communications agent application illustrated as requesting communications agent 403a. Communications agent 403a may operate in requesting execution environment 401a of requesting node 502 on behalf of a requesting communicant to communicate with another communications agent, such as access communications agent 403b, illustrated in FIG. 4B operating in access execution environment 401b and/or with a communications service, such as communications service 407c, illustrated in FIG. 4C FIG. 5. FIG. 4A also illustrates a user agent 405a application, such as a web browser. User agent 405a may operate in requesting execution environment 401a of requesting node 502 to communicate with one or more web services.

Access communications agent 403b, like requesting communications agent 403a, represents a communicant. For illustrative purposes, a communicant of an access communications agent is referred to herein as an access communicant. An access communications agent may represent more than one communicant. Exemplary communications agents include email clients, phone clients including Voice over Internet Protocol (VoIP) clients, instant messaging clients, short message service (SMS) clients, multimedia message service (MMS clients), multi-media communications clients including video phone clients, and other communications agents.

Applications in FIG. 4A-C, operating in respective execution environments 401 may interoperate via respective network stacks 409. Applications may exchange data via network 508, in FIG. 5, via one or more communications protocols. FIG. 4A-C each illustrate respective communications protocol components 411 exemplifying subsystems to exchange data via network 508 according to one or more communications protocols, such as simple mail transfer protocol (SMTP), post office protocol (POP), an instant messaging protocol, and/or a real-time voice and/or video protocol. A communication between applications may include more than one type of data and may use one or more communications protocols in exchanging data via network 508.

Instances, adaptations, and/or analogs of applications in FIG. 4A-C may communicate via a request/reply protocol, a data streaming protocol, a session and/or connection-oriented protocol, a connectionless protocol, a real-time communications protocol, an asynchronous communication, a store and forward communications protocol, a reliable delivery communications protocol, a best-effort delivery communications protocol, and/or a secure protocol, to name a few communications options.

FIGS. 4A-B illustrate communications agents, requesting communications agent 403*a* and access communications agent 403*b* respectively. Each is illustrated including a content manager component 413. A content manager component 413 may interoperate with a communications protocol layer component 411 and/or network stack 409 to send and/or receive data in one or more communications via network 508, in FIG. 5, with another communications agent, a controller component, a communications switch, and or other compatible component in another execution environment and/or node. A content manager component 413 may be operatively coupled, via a com-in component 415, to a communications protocol component 411 to receive the data from communications agents in other nodes.

Data received in a communication may include data having one or more content types. Exemplary content types include plain text, markup such as hypertext markup language (HTML), audio data, image data, and/or executable data. Executable data may include script instruction(s), byte code, and/or machine code. In FIG. 4A and in FIG. 4B, requesting communications agent 403*a* and access communications agent 403*b* may respectively include one or more content handler components 417 to process data received according to its content type. A data type may be identified by a MIME type identifier and/or a file type extension, for example. Exemplary content handler components 417 include a text/html content handler component to process HTML representations; an application/xmpp-xml content handler component to process extensible messaging and presence protocol (XMPP) streams including presence tuples, instant messages, and audio content handlers including and/or enabled to retrieve suitable codices; one or more video content handler components to process video representations of various types; and still image data content handler components to process various image data representations.

Content handler component(s) 417 process received data representations and may provide transformed data from the representations to one or more user interface element handler components 419. One or more user interface element handler components 419 are illustrated in respective presentation controllers 421 in FIGS. 4A-B. A presentation controller 421 may manage visual, audio, and other types of output for its including application as well as receive and route detected user input and event data to components and extensions of its including application. A user interface element handler component 419 may operate at least partially in a content handler component 417 such as a text/html content handler component and/or a script content handler component. Additionally or alternatively, a user interface element handler component in an execution environment 401 may be received in a communication. For example, a communication, such as an email, may include an HTML content type portion and a script content type portion.

Figure 6A:
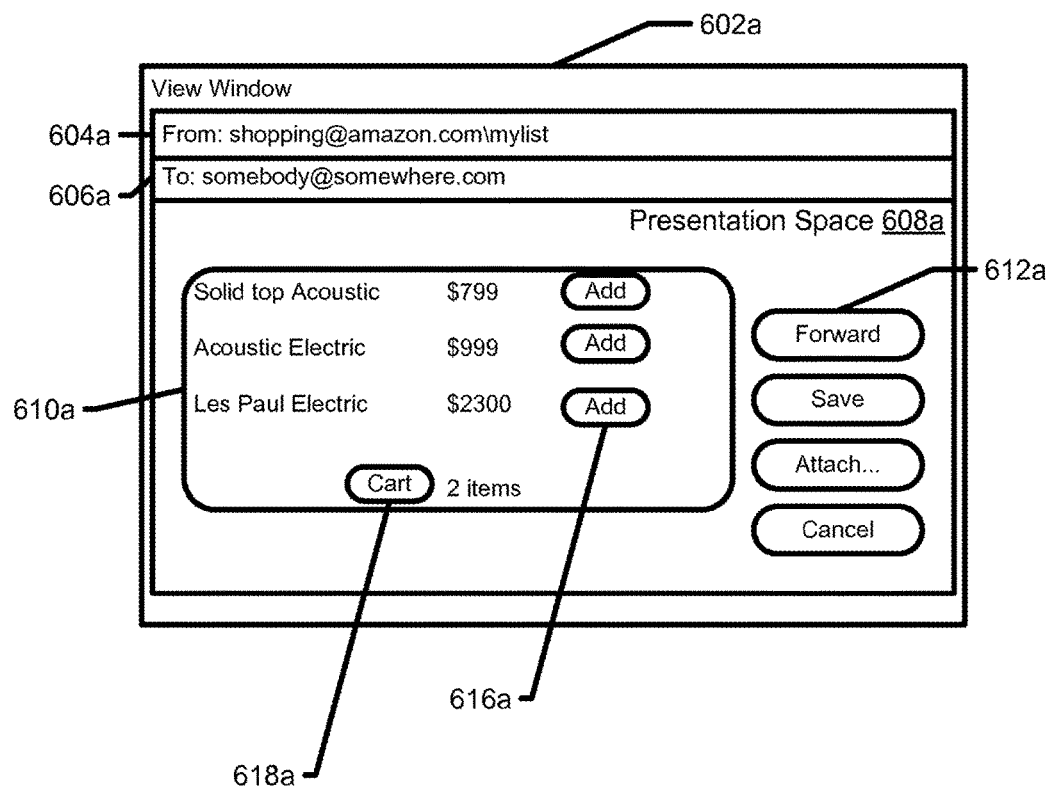
FIG. 6A is a diagram illustrating a user interface presented via a display according to another aspect of the subject matter described herein.
Figure 6B:
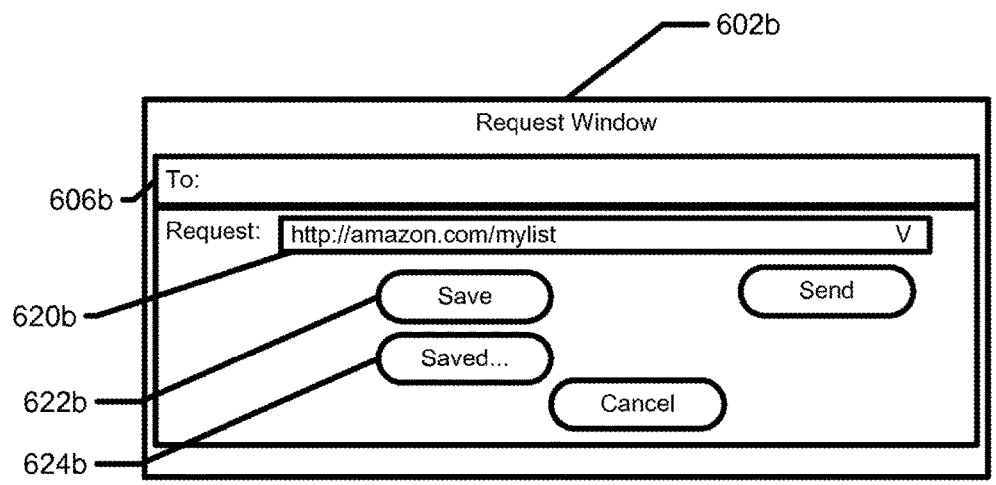
FIG. 6B is a diagram illustrating a user interface presented via a display according to another aspect of the subject matter described herein.
Figure 6C:
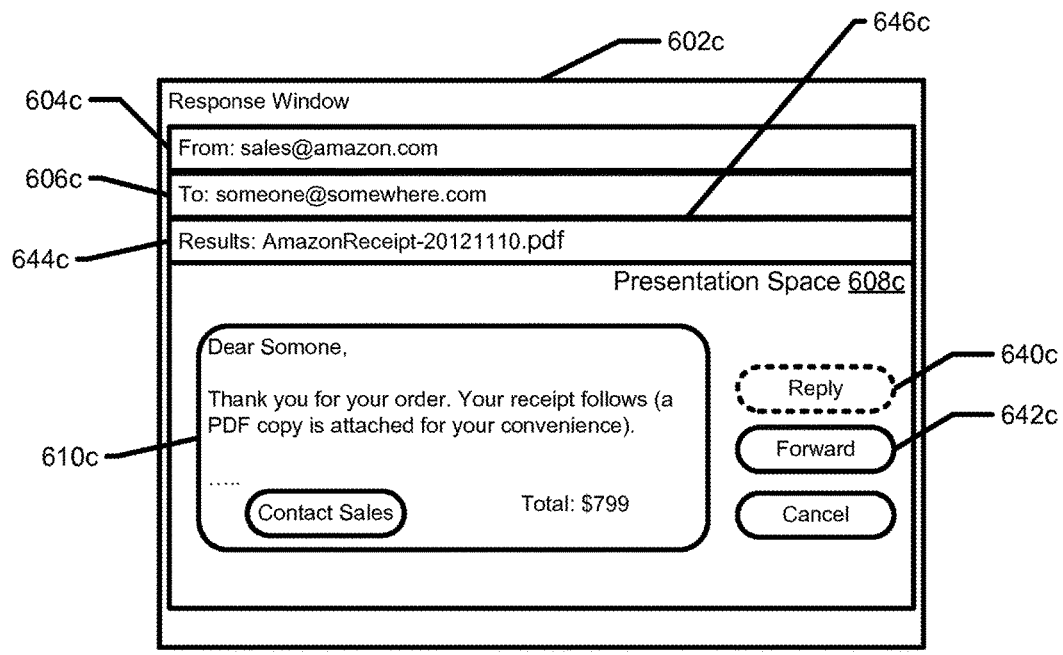
FIG. 6C is a diagram illustrating a user interface presented via a display according to another aspect of the subject matter described herein.

FIGS. 6A-C illustrate various UI elements 602 presentable in a presentation space of a display device, such as output device 130 in FIG. 1. A view window 602*a*, in FIG. 6A, includes a contactor user interface (UI) element 604*a* to present an identifier of a communicant in the role of a contactor in a communication. Note that a communicant identifier may include a path and/or a query portion that identifies a resource, such as the "\mylist" path included in the contactor communicant identifier in contactor UI element 604*a*. A view window 602*a* also includes a contactee UI element 606*a* to present one or more contactee identifier(s) identifying one or more communicants in the role of contactee(s) included in the communication. A presentation space 608*a* is provided in a view window 602*a* to present a communicant message UI element 610*a* to present a communicant message addressed to one or more contactees identified in a contactee UI element 606*a*. The presentation space 608*a* may also be provided to present one or more UI controls to exchange data in and/or otherwise manage a communication. A forward UI element 612*a* illustrates an exemplary UI element that may correspond to user input to send data in a communication to one or more identified contactees.

Data to send in a communication to a communications agent may be received by one or more content handler component(s). For example, in FIG. 4A, a content handler component 417*a* may operate in requesting communications agent 403*a* to transform data from one or more UI element handler components 419*a* into one or more data representations suitable to transmit in a communication and/or suitable to process by another communications agent, such as access communications agent 403*b* in access execution environment 401*b*, and/or a communications service, such as communications service 407*c*. The one or more data representations may be provided to content manager component 413*a* to send in the communication to one or more communications agents and/or communications services. Content manager component 413*a* may package and/or otherwise prepare for packaging the one or more data representations in a data unit or message formatted according to a communications protocol of the communications agent 403*a*. Communications protocol component 411*a* may send the data according to the specification(s) of the communications protocol. Content manager component 413*a* may alternatively or additionally encode and/or otherwise transform one or more of the data representations to send in a data stream such as voice stream and/or a video stream to communicate in the communication to a communications agent via a network.

Content manager component 413*a* operating in requesting execution environment 401*a* may provide the packaged, encoded, and/or transformed data to communications protocol component 411*a* via a com-out component 406*a*. Com-out component 406*a*, as described above, operatively couples content manager component 413*a* to communications protocol component 411*a* according to an interface provided by communications protocol component 411*a* to send data in a communication according to a communications protocol. Communications protocol component 411*a* may further package and/or otherwise transform the data to send via network stack 409*a* to deliver via network 508 to another communications agent based on a contactee communicant identifier.

A communicant in a communication may be identified by a communicant identifier in an address space of a communications protocol. In one aspect, information identifying a communicant identifier may be received from a communicant of a communications agent in an execution environment. In FIG. 4A, presentation controller 421a and/or a UI element handler 419a, may present and/or manage interaction with contactor UI element 604 in FIG. 6A presented by requesting execution environment 401a. Presentation controller 421a and/or a UI element handler 419a may receive a contactor alias and/or a communicant identifier in response to a user input corresponding to contactor UI element 604. The user of requesting execution environment 401a may enter a contactor alias, such a user's name, via a keyboard and/or may select a predefined communicant alias and/or communicant identifier presented in a selection UI control element via a UI element handler component 419a. The user input may be detected by input driver 423a. Corresponding input information may be routed to presentation controller 421a by GUI subsystem 425a. GUI subsystem 425a may send presentation information to a display device via a graphics subsystem 427a. Communications agent 403a may identify a communicant identifier associated with the contactor alias, such as "shopping@amazon". Other communicant identifiers, such as for one or more contactees, may be received similarly and/or in any suitable manner.

Data may be sent in a communication according to a form or type of the communication and/or other attribute of the communication such as a security attribute, the amount of data to be sent, a priority setting, a task setting, and the like. Some forms of communication do not require a session and/or connection between communications agents in a communication in order to exchange data in the communication, while others do. An email and/or instant message may use a store and forward model of delivery.

Data may be sent in a communication in response to a communicant input. A contactor may provide an input corresponding to forward UI element 612a in FIG. 6A. The input may be received by presentation controller 421a, in FIG. 4A, and/or by one or more UI element handlers 419a corresponding to forward UI element 612a. In response to detecting the input, presentation controller 421a may provide data to be sent in the communication to one or more content handler components 417a according to the content type(s) of the data to be sent.

The one or more content handler components 417a may encode, format, and/or otherwise transform the data to send in a communication, such as in an email message. The one or more content handler components 417a may provide data to be sent to content manager 413a, instructing content manager component 413a to send the data in the communication to deliver to another communications agent and/or communications service. Content manager component 413a interoperating with com-out component 406a may further format and/or transform the data to send in the communication according to a communications protocol, for example according to an email communications protocol, by communications protocol component 411a. Communications protocol component 411a may send the communication to deliver to a communication service via an access communications agent.

For session-oriented and/or connection-oriented communication a session and/or connection may be established if a session/connection has not already been established. Data may be sent to deliver to a communications agent identified based on a contactee communicant identifier during session and/or connection setup. For example, for a voice communication, the voice communication may be established via a session initiation protocol. Communications protocol component 411a may operate according to the session initiation protocol specifications. Communications protocol component 411a operating in requesting execution environment 401a may locate a communications agent and/or an access communications agent by communicating with one or more nodes in network 508 according to the session initiation protocol. Communications protocol component 411a may locate, for example, access communications agent 403b in access execution environment 401b, based on a communicant identifier for a contactee in the communication.

Once a communication session is established, such as a voice session, data may be sent according to the session communications protocol, such as RTP, or some other communications protocol. For example, data may be sent according to a session initiation protocol in the communication to manage the voice communication session and/or to exchange text, image, and/or other data outside of the voice session.

FIG. 4A includes a second application illustrated by user agent 405a. As defined above, user agent 405a may be a web browser. User agent 405a in FIG. 4 and communications service 407c in FIG. 4C may interoperate via respective network stacks 409 in requesting execution environment 401a and service execution environment 401c. User agent 405a and communications service 407c may communicate via one or more web protocols when the communications service operates as a web service. FIG. 4A and FIG. 4C respectively illustrate web protocol components 429. Web protocol components 429 in requesting execution environment 401a and in service execution environment 401c may exchange data via one or more versions of the Hypertext Transfer Protocol (HTTP).

User agent 405a, in FIG. 4A, may receive some or all of web application agent 431a in one more messages sent from communications service 407c, in FIG. 4C via network stacks, network interface components, and web protocol components in the respective execution environments. In FIG. 4A, user agent 403a may interoperate with web protocol component 429a and/or network stack 409c to receive the message or messages including some or all of web application agent 431a.

Web application agent 431a may include a web page or other data representation for presenting a user interface for communications service 407c. The web page may include and/or reference data represented in one or more formats including hypertext markup language (HTML) and/or other markup languages, ECMAScript or other scripting languages, byte code, image data, audio data, and/or machine code to name just a few valid data representations depending on the capabilities of a receiving user agent node.

In response to web request, such as an HTTP request, received by an application server 433c from user agent 405a, a communications relay 435c, in FIG. 4C, may receive request data based on the web request from application server 433c. A request handler component 437c in communications relay 435c may invoke model subsystem 439c to perform request specific processing via model subsystem 439c. Model subsystem 439c may include any number of command processors, illustrated as command handler components 414c, that may dynamically generate data and/or retrieve data from model database 441c based on the command included in performing the request. Communications relay 435c may further invoke one or more response generator components 416c to generate response data to construct a web response for the received web request. The one or more response generator components 416c may invoke template engine component 445c to identify one or more templates and/or other static data to combine with data received from command handler component(s) 414c generated in processing the command. FIG. 4C illustrates template database 447c including one or more templates illustrated by template 449c. The one or more response generator component(s) 416c in view subsystem 451c may interoperate with response handler component 453c in communications relay 435c to return a web response generated from processing a request. The web response may be returned in one or more data formats suitable for a user agent, such as browser 404. Response handler component 453c may receive response data from one or more response generator components 416c as one or more entities such as MIME entities. Alternatively or additionally, response handler component 453c may transform response data from one or more response generator component(s) 416c into one or more entities and/or data representations. Response handler component 453c may send the one or more entities in a web response, in response to the web request. The entities may include one or more HTTP entities sent in an HTTP response, in response to a HTTP request received from a user agent, such as user agent 405a in FIG. 4A. Some or all of web application agent 431a may be sent to user agent 405a via network application server 433c in the manner described.

One or more web responses including one or more representations of some or all of web application agent 431a may be received by user agent 405a via web protocol component 429a and network stack 409a. In FIG. 4A, user agent 405a may include one or more content handler components to process received data representations, such as HTTP entities, according to their data types, typically identified by MIME-type identifiers. Exemplary content handler components that operate in and/or with user agent 405a include a text/html content handler component for processing HTML representations; an application/xmpp-xml content handler component for processing XMPP streams including presence tuples, instant messages, and publish-subscribe data as defined by various XMPP specifications; one or more video content handler components for processing video representations of various types; and still image data content handler components for processing various image data representations. Content handler component(s) in user agent 405a process data representations received in web responses and may provide data based on the representations to one or more user interface element handler components included in and/or otherwise interoperating with user agent 405a.

User agent 405a may manage visual, audio, and other types of output. User agent 405a may send presentation information to present one or more UI elements via an output device, such as a display device. The display device may include a presentation space to represent a UI element, such as a browser window or tab. The UI element may be presented by and/or on behalf of user agent 405a, web application agent 431a, and/or communications service 407c which may include and/or may be included in a web application.

FIGS. 4B-C illustrates respective web protocol components 429 that may interoperate with access communications agent 403b. An access communications agent 405 may operate as a user agent in communicating with a communications service operating as a web service. FIG. 4C illustrates communications service 407c operatively coupled to web protocol component 429c to exchange data with one or more user agents, such as user agent 405a in FIG. 4A and/or access communications agent 403b in FIG. 4B. In an aspect, communications service 407c may be operatively coupled to a communications protocol component 411c as FIG. 4C illustrates. Communications service 407c may exchange data in a communication with a communications agent, such as communications agent 403a, in FIG. 4A, and/or an access communications agent 403b, in FIG. 4B.

With reference to FIG. 2A, a block 202 illustrates that the method includes receiving, from a first user, via an input detected by an input device, by a first communications agent operating in a first execution environment, request information identifying a first universal resource identifier (URI). Accordingly, a system for browsing via a communications agent includes means for receiving, from a first user, via an input detected by an input device, by a first communications agent operating in a first execution environment, request information identifying a first universal resource identifier (URI). For example, the arrangement in FIG. 3A, includes URI director component 302 that is operable for and/or otherwise included in receiving, from a first user, via an input detected by an input device, by a first communications agent operating in a first execution environment, request information identifying a first universal resource identifier (URI). FIG. 4A-B illustrate URI director components 402 as adaptations and/or analogs of the URI director component 302 in FIG. 3A. One or more URI director components 402 operate in an execution environment 401. A system for browsing via a communications agent includes one or more processors and logic encoded in one or more computer readable media for execution by the one or more processors that when executed is operable for and/or otherwise included in receiving, from a first user, via an input detected by an input device, by a first communications agent operating in a first execution environment, request information identifying a first universal resource identifier (URI).

Figure 7:
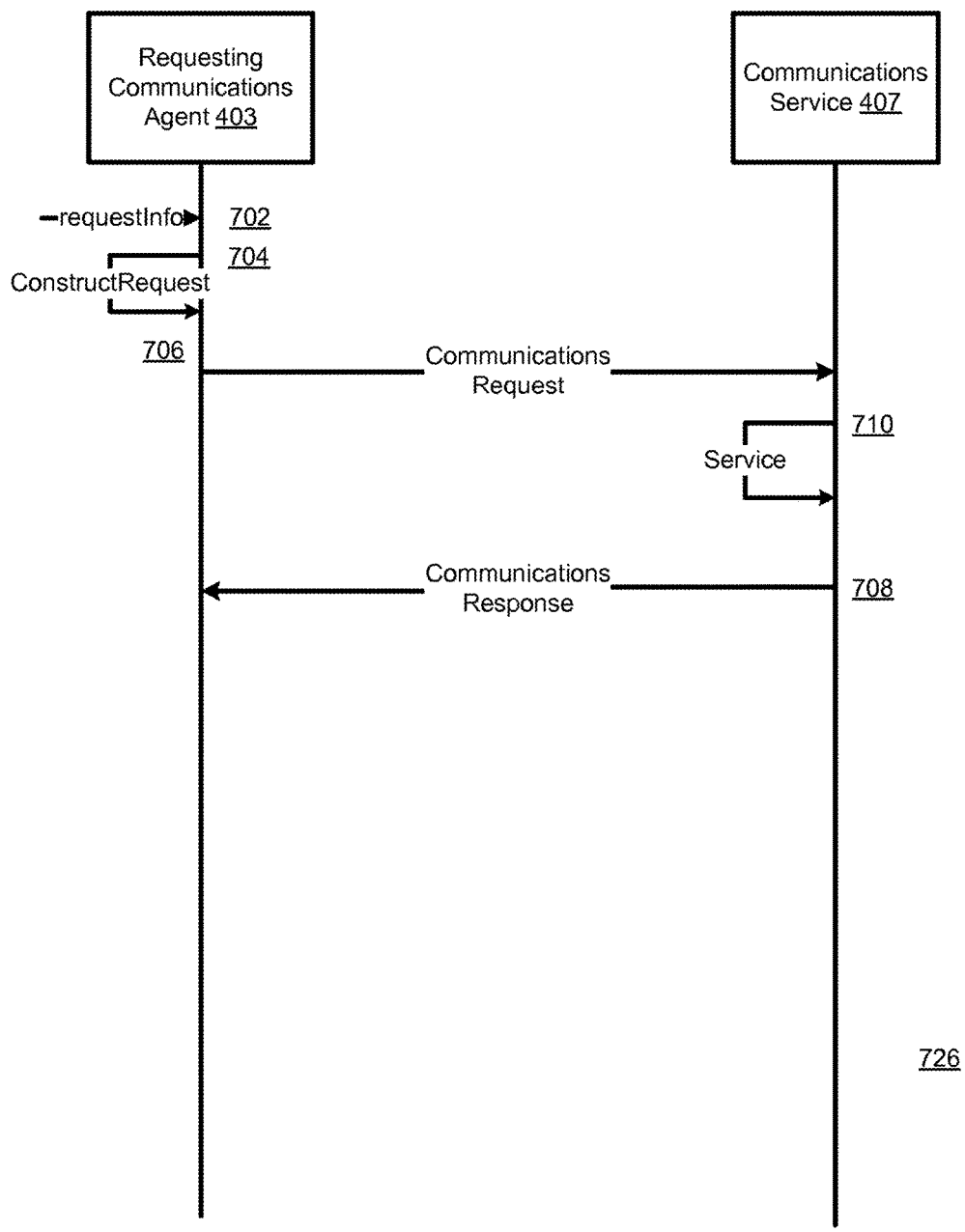
FIG. 7 is a message flow diagram illustrating an exemplary data and execution flow for browsing via a communications agent according to an aspect of the subject matter described herein.

FIG. 7 illustrates a request information (requestInfo) dataflow 702 that may be a dataflow internal to requesting execution environment 401a in FIG. 4A and/or may include receiving data via network 508 by requesting execution environment 401a.

Request information dataflow 702, in FIG. 7, may include request information received by and/or otherwise identified to a UI element handler component 419a in communications agent 403a, in response to user input. The request information may identify a universal resource identifier (URI), such as a universal resource locator (URL). A URI director component 402a may receive the request information based on the input information. In another aspect, a request information dataflow may include request information received by content manager component 413a, in FIG. 4A, via network 508 from, for example, a user agent operating in a node (not shown) in network 508. A URI director component 402a may receive the identified request information via interoperation with content manager component 413a.

Receiving request information may include presenting a UI element to a user, via an output device. The request information may be received from the user via one or more inputs, detected by one or more input devices, where the input(s) correspond to the UI element. A UI element handler component 419a, in FIG. 4A, may detect a user input via a mouse and/or touch input device that corresponds to an "add" button UI element 616a, in FIG. 6A, presented in a communicant message UI element 610a in a view window 602a presented by requesting communications agent 403a. The UI element handler component 419a may interoperate with a content handler component 417a to determine that the input corresponds to a URL to include in a communications request to add a "Les Paul Electric" guitar to a shopping cart at Amazon. View window 602a is presented to view a communicant message from a communicant identified by shopping@amazon.com in contactor UI element 604*a*. In an aspect, illustrated in FIG. 6A, the contactor communicant identifier includes a path portion, "\mylist", that identifies a resource associated with the communicant message in communicant message UI element 610*a*. In another aspect, a URL that corresponds to "add" button UI element 616*a* may include some or all of the contactee communicant identifier shown in contactor UI element 604*a* allowing a relative URL to be associated with "add" UI element 616*a*.

An information input UI element may be presented by a requesting communications agent in a user interface element presented to create a new communicant message, a user interface element presented to reply to a previously received communicant message, a user interface element presented to receive request information while not allowing the requesting user to edit a communicant message, and a main application window of the requesting communications agent.

FIG. 6A illustrates data received in a communication from a communications service identified by the communicant identifier, "shopping@amazon", illustrated in contactor UI element 604*a*. A path portion, "\mylist", identifies a resource of the communications service associated with the communication, such as content in a communicant message. A communicant message may include a communications response to a previously sent communications request. A communicant message may include a communicant message to be sent to a communications service and a communicant message previously received in a communication. For example, a communications request sent in response to an input corresponding to "add" UI element 616*a* may include part of the communicant message presented in UI element 610*a*. Further, communications agent 403*a* may present a user interface to receive a communicant message to add to the communicant message in UI element 610*a* in response to detecting an input corresponding to forward UI element 612*a* or in response to detecting an input corresponding to add UI element 616*a*.

Request information may be received in response to interaction between a user and execution environment 401*a* where a URI is provided by the user via the interaction. For example, FIG. 6B, illustrates a request window 602*b* that may be presented by requesting communications agent 403*a* to interact with a requesting user to receive request information via interaction with a user where the user enters a URL in a combo box UI element 620*b*. In another aspect, an attachment may be identified in response to a user input. The attachment may include request information that identifies a resource identifier such as a URI. Instead or in addition to receiving and presenting request information identifying a URI via a text box, request information may be pasted in a user interface element presented by a requesting communications agent in response to a user input. A URI may be a URL, as indicated above. A URL identified by request information may be based on a communications protocol.

Request combo box 620*b*, in FIG. 6B, represents a URL, http://amazon.com/mylist, which may be received via a keyboard and/or selected in a pull-down list of the combo box 620*b*. The URL illustrated in combo box 620*b* may identify a wish list, a saved shopping list, or a list of gifts for someone—too name a few examples. A communications request based on the URL in combo box 620*b* may be sent to a contactee. The contactee's communicant identifier is not shown in the contactee UI element 606*b* in FIG. 6B. In an aspect, given a URL, a communicant identifier may be determined automatically, as described below in more detail, based on a template and/or specified process for mapping specific request information, such as an HTTP URL, to a communicant identifier, such as an email address.

FIG. 6B illustrates a UI element presented for creating a new communications request. Note that request window 602*b* does not allow a user to provide and/or otherwise edit a communicant message. FIG. 6A illustrates a UI element presented to allow a communications response to the communications request to be presented, as illustrated in communicant message UI element 610*a*. Note that no reply button or other UI control is provided in window 602*a* allowing the user to edit a reply communicant message in UI element 610*a*.

FIG. 6A illustrates an exemplary user interface that may be presented to view a received communicant message, as described above. The user interface in FIG. 6A may be presented by communications agent 403*a*, in FIG. 4A, operating in requesting execution environment 401*a* of requesting node 502 in FIG. 5. A UI element handler component 419*a* may operate to present a user interface element to allow a user to identify request information, for example, to select an item to add to a shopping cart via an input corresponding to one or more button UI controls in the received message, such as add UI button 616*a* and cart UI element 618*a*. Cart UI button 618*a* may identify a URL to include in a communications request to retrieve a shopping cart for the user identified by the communicant identifier "somebody@somewhere.com".

Those skilled in the art will understand that numerous languages and/or schemas for providing request information for various types of requests currently exist and more will be specified. For example, request information may include and/or otherwise identify search information to create a search query and/or query request for a search engine. Request information may identify a resource such a file and/or a service to access. Request information may include data to store and/or otherwise process by a communications service.

An information input UI element presented to receive request information from a user, as described above, may be included in a plurality of information input UI elements presentable by a requesting communications agent. An information UI element may be selected by a requesting communications agent based on an attribute of a request, such as whether it is a request to modify a resource or a request to retrieve a resource. A content handler component 417*a* may identify a request attribute when included in communication received via a network and/or via input from a user. An information UI element may be selected, identified, and/or otherwise determined by a communications agent 403 based on a communicant identifier included in a communication, and/or based on an attribute of a communications service and/or an access communications agent to be included in processing a communications request. An information input UI element may be selected and presented based on a multi-stage transaction that includes sending a particular communications request in processing the transaction. Exemplary types of requests include a search request, a service access request, a data access request, a data submit request, a create request, a delete request, and a change request—too name a few examples. A request may have one or more types.

In an aspect, a service execution environment 401*c*, illustrated in FIG. 4C, may provide a schema for a communications request that a communications agent may process to present an information UI element to receive request information for a communications request to be processed by the communications service of the service execution environment. An information UI element may be selected to present to receive request information based on a communication received previously by the presenting communications agent, as FIG. 6A illustrates. Alternatively or additionally, an input from user represented by a requesting communications agent may be included in identifying an information UI element to present. For example, the user may select and/or otherwise identify a communications service, a resource type, a request type, and/or a security attribute that may be processed by a requesting communications agent in identifying an information UI element to present in receiving request information. In FIG. 4A, a presentation controller component 421a may present request window 602b in FIG. 6B in response to a user input that identifies a schema for and/or a type of a communications request.

Receiving request information may include detecting, by a requesting communications agent 403a, a hyperlink, representing the URI, in a communicant message as described above with respect to "add" UI element 616a and cart UI element 618a in FIG. 6A. Add UI element 616a identifies a URL or a portion of a URL for a communications request to add a particular item to a particular shopping cart. Cart UI element 618a identifies a URL or a portion of a URL for a communications request to retrieve information about an identified shopping cart represented and/or otherwise maintained by a communications service associated with the contactee identified in contactee UI element 604a.

In an aspect, a detected input that corresponds to add UI element 616a may result in a communications request being sent, but not result in a new UI element for creating a new communication. That is, the communications result may be sent automatically with further user input in response to the input that corresponds to the URL of the add UI element 616a. A detected input that corresponds to cart UI element 618a may also result in a communications request being sent automatically. A corresponding communications response when received may be processed by a communications agent by replacing and/or otherwise updating the content of communicant message UI element 610a. Requesting communications agent 403a may process the communications response including updating UI element 610a automatically, in response to receiving the communication s response. Communications agent 403a may support more than one request information schema. Thus, a communications agent may provide a user interface to receive valid request information for a number of respective schemas.

An information input UI element may be integrated with a user interface presented to interact with a user to generate, edit, and/or view a communicant message. Alternatively or additionally, a communications agent may provide an information input UI element integrated in to a main window presented by the communications agent and/or may present an information input UI element in a tab and/or in a dialog box. FIG. 6B illustrates an arrangement of UI elements some or all of which may be presented as a dialog box, in a tab, and/or in main window of communications agent 403a in FIG. 4A. As with FIG. 6A, a UI element handler component 419a may operate to present information UI elements illustrated by request combo box element 620b, in FIG. 6B, in request window UI element 602b. The same or different UI element handler component 419a may present various other UI elements included in request window UI element 602b. Request window UI element 602b and one or more UI elements it includes may be presented by one or more corresponding UI element handler component(s) 419a that may operate based on a schema that defines valid request information to create a communications request by communications agent 403a.

A mapping template may be used to map an HTTP URL to an email address or other type of communicant identifier and/or URL, such a phone number to send a communications request as audio data. Receiving request information may include determining a URI based on a URI template. For example, a communicant identifier may be designated for receiving communications requests, such as services@% variable % where % variable % may include a host and/or a domain name. FIG. 6B illustrates no contactee address. A mapping to "shopping@amazon.com" may be located manually or automatically, by a URI director component 402a, based on the domain portion of the URL in combo box UI element 620b in identifying a contactee communicant identifier defined to receive shopping related requests for the amazon.com service provider.

In an aspect, a search@% variable %, where % variable % may include a host and/or a domain name, may be defined as a template communicant identifier for identifying contactees to send communications requests including and/or identifying a search query. A post@% variable % template may be used to identify communicant identifiers for submitting or posting data. A get@% variable % template may be used to identify communicant identifiers for retrieving a resource, such as a document or form. A set of templates may be defined to identify a command set that may be used across a number of service providers. A pay@% variable % template communicant identifier may be defined for paying fees or for purchases.

Communications URL schemas for which mapping templates may be specified include mailto URS, SMS URLs, SMSTO URLs, MMS URLs, SIP URLs, phone URLs, and various instant message URLs. Examples of instant messaging URLs include MSNIM URLs, YMSGR URLs, AIM URLs, GTALK, URLs, and SKYPE URLs.

As described above with respect FIG. 6A, a communications URL may be specified to include a path portion. A path portion may identify a resource accessible via a communications agent that represents a communicant identified by the communication URL and/or may identify a communications service provider. Alternatively or additionally, a communications URL may include a query portion analogous to HTTP URLs. A query portion may be included in identifying an operation, a data resource, and/or other resource included in processing a communications request. A query portion may identify parameters for a command or operation performed by a communications service in processing a communications request. For example. A query portion may include a parameter that identifies a credit card to process a checkout request for an online retail communications service.

As described, UI element 620b illustrates a combo box allowing a user to enter a URI by a keyboard, keypad, voice, and/or gesture. In another aspect, receiving request information may include identifying a URI in a plurality of bookmarks. The bookmarks may identify respective request information. Bookmarks may represent a history or activity log, a list of user selected and/or otherwise saved instances of request information, and/or may represent requests included in a task list and/or workflow. FIG. 6B, includes a save button UI element 622b that may be presented to receive input information from a user instructing URI director component 402a to save request information received via request UI element 616b. A favorites list may be created via this means. A saved button UI element 624b may be provided to receive input information from a user instructing URI director component 402a to retrieve one or more saved searches. Selection information may be received by URI director component 402a that identifies a saved request to fill in data in combo box UI element 620b for the user.

With reference to FIG. 2A, a block 204 illustrates that the method includes generating, based on the first URI, by the first communications agent, a communications request. Accordingly, a system for browsing via a communications agent includes means for generating, based on the first URI, by the first communications agent, a communications request. For example, the arrangement in FIG. 3A, includes request constructor component 304 that is operable for and/or otherwise included in generating, based on the first URI, by the first communications agent, a communications request. FIGS. 4A-B illustrate request constructor components 404 as adaptations and/or analogs of the request constructor component 304 in FIG. 3A. One or more request constructor components 404 operate in an execution environment 401. A system for browsing via a communications agent includes one or more processors and logic encoded in one or more computer readable media for execution by the one or more processors that when executed is operable for and/or otherwise included in generating, based on the first URI, by the first communications agent, a communications request.

FIG. 7 illustrates a construct request dataflow 704 that may be a dataflow internal to requesting execution environment 401a in FIG. 4A and/or may include receiving data via network 508 by requesting execution environment 401a. A construct request dataflow may include an exchange of request information between a URI director component 402 and a request constructor component 404, as illustrated in FIGS. 4A-B. A construct request dataflow may be and/or may occur in response to a user input, detected by communications agent 403a. The user input may be specified to identify a command to send a communications request based on received request information in a request information dataflow. In another aspect, a construct request dataflow may include an exchange of request information and/or information based on request information received by content manager component 413a and provided to request constructor component 404a, via network 508 from, for example, a browser operating as a user agent in a node (not shown) in network 508

A request constructor component 404 may be a type of content handler component that operates to process request information to create a communications request that conforms to a schema to create and/or otherwise to construct a valid communications request. A request constructor component may construct from and/or otherwise transform request information into a communications request based on a schema that defines and/or otherwise identifies a valid communications request for a particular type of data unit, message, and/or communication supported by a communications agent. Request constructor component 404a, operating in requesting execution environment 401a of requesting node 502, may provide a communications request to content manager component 413a to include and/or otherwise identify a communications request in a message and/or data unit of a communications protocol in a communication with an access communications agent 403 and/or with a communications service 407.

As described above, content manager component 413a, in FIG. 4A, may operate in requesting execution environment 401a to transform request information into a communications request to include along with data for other parts of a communication into one or more data representations suitable for transmitting in the communication, such as a message, to another node, such as access execution environment 401b of access node 504 or service execution environment 401c of service node 506. Some or all of the data representations transmitted are suitable for processing by a receiving access communications agent 403 and/or communications service 407. Content manager component 413a in the requesting execution environment 401a may package the one or more data representations including a representation of the communications request into a message and/or data unit according to the communications protocol.

In an aspect a communications request may be included in a communicant message portion of a communication. In another aspect, a communications request may be included in a communication in a request portion that is at least partially separate from a communicant message portion. In yet another aspect, a communications request may be sent in a communication without an accompanying communicant message.

Figure 8A:
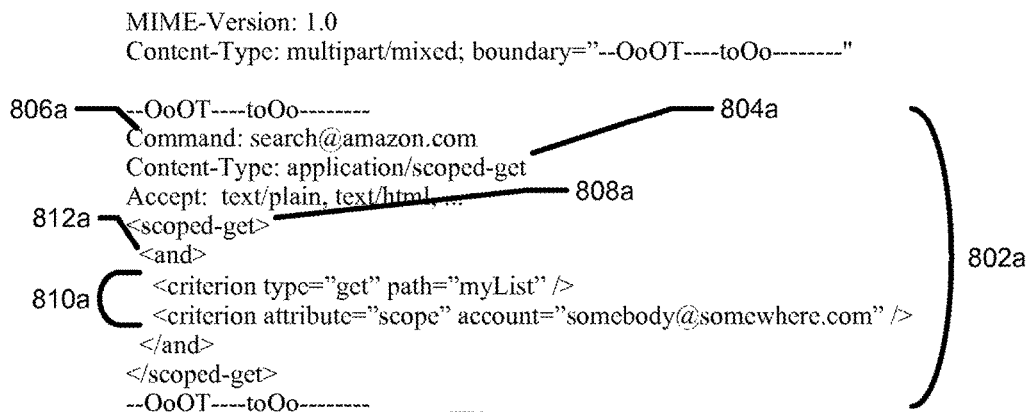
FIG. 8A illustrates an exemplary portion of a communication according to an aspect of the subject matter described herein.
Figure 8B:
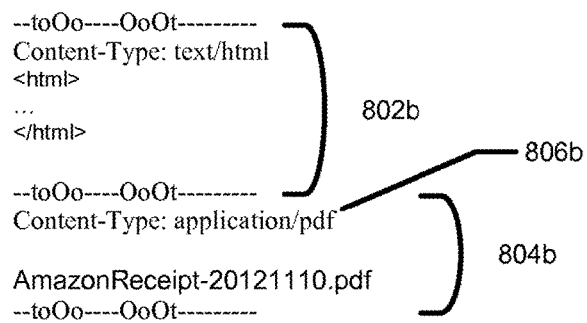
FIG. 8B illustrates an exemplary portion of a communication according to an aspect of the subject matter described herein.

In FIG. 8A, a portion of an email communication 800a is illustrated formatted as a multipart/mixed content type including communications request portion 802a. A communications request may be identified by an identifier defined for locating the communications request in a communication. The identifier may be a MIME type identifier and/or a markup language element. In another aspect, a communications request portion of a communication may be identified as a communications request by its location in the communication. The location may be specified relative to another defined location and/or portion of a communication. A communications request may be detected based on content included in a communicant message portion of a communication and/or based on metadata. FIG. 8A includes as content-type header 804 identifying a MIME type identifier, "application/scoped-get", which may be defined to identify a communications request represented by an extensible markup language (XML) document. The "application/scoped-get" MIME type identifier is exemplary. Other MIME type identifiers exist and/or may be defined to identify a communications request in a communication. Additionally or alternatively, a "command" header 806a or an analogous header may be reserved and specified for identifying a communications request, and may serve other purposes as well.

A MIME type identifier, such as "application/scoped-get" in FIG. 8A, may be defined to identify a schema for an XML-based language for specifying a type of XML document, such as scoped-get XML document 808a illustrated in FIG. 8A. The scoped-get document 808a, as illustrated, includes criterion tag elements 810a corresponding to some or all of a URI such as a query portion. Data for the URI may be received via an input information UI element, such as combo box UI element 620b in FIG. 6B and/or a different form UI element presented to a user. A criterion tag element 810a identifies a type attribute with a value of "get" indicating a type of request. A "path" attribute identifies a location of a resource to "get", locate and/or otherwise identify. The criterion tag element 810a identifies a value for a path "\myList". Another criterion tag element 808a specifies a scope for resource types identifying the path is associated with and/or otherwise restricted to a particular account. FIG. 8A illustrates an "and" tag 812a indicating that all the criteria must be met in processing the request. An "or" tag (not shown) may be defined by a schema for scoped-get documents. Other operator elements and operator precedence may be defined by the schema. Grouping elements for managing operator precedence, such as a parenthesis element, may be defined by the schema.

In various aspects, a communications request in a communication may include and/or otherwise may identify a search expression, a lookup key, at least a portion of a file path, an XML document such as SOAP document, a resource type identifier, an identifier of an attribute of an acceptable response, authentication information, authorization information, a time out for a response, subscription information, an identifier of a geospatial location, a date, and/or a time—among other request attributes. A communications request may include an attribute or indicator instructing a communications service and/or an access communications agent that no communications response is required or that a communications response may be combined in a communication with one or more other communications responses.

In FIG. 8C, a portion of a communication 800c is illustrated formatted as an email. A communications request portion 802c identifies a URL. The communications request may be detected based on its format, as it includes a path and parameters indicating a request. The request identified by and/or otherwise based on the URL is a requested to add an item to a shopping cart. The item is identified by an SKU identifier and the cart is identified by a cart identifier provided as URL parameters. A command-type header 804c may be included to identify a request type, if needed or desired. A CC header 806c also identifies a URL. In an aspect, a CC communicant identified in a communications request may be copied on one or both of the communications request and a corresponding communications response. A URL identified in CC header may include path and/or parameters portions indicating that a communications agent representing the identified communicant may process the communications request and/or may process one or more corresponding communications response(s) as communications requests. For example, a communications agent representing the communicant identified in the CC header may process one or both of the communications request and communications responses as a request for a resource that updates a ledger for a client identified by the "From" header 808c in the original communications request illustrated in FIG. 8C.

With reference to FIG. 2A, a block 206 illustrates that the method includes sending, in response to receiving the request information by the first communications agent via a network in a communication, the communications request. Accordingly, a system for browsing via a communications agent includes means for sending, in response to receiving the request information by the first communications agent via a network in a communication, the communications request. For example, the arrangement in FIG. 3A, includes com-out component 306 that is operable for and/or otherwise included in sending, in response to receiving the request information by the first communications agent via a network in a communication, the communications request. FIG. 4A-B illustrate com-out components 406 as adaptations and/or analogs of the com-out component 306 in FIG. 3A. One or more com-out components 406 operate in an execution environment 401. A system for browsing via a communications agent includes one or more processors and logic encoded in one or more computer readable media for execution by the one or more processors that when executed is operable for and/or otherwise included in sending, in response to receiving the request information by the first communications agent via a network in a communication, the communications request.

FIG. 7 illustrates a communications request dataflow 706 that includes transmitting a data unit and/or message of a communications protocol. The data unit and/or message may be sent via the communications protocol from communications agent 403a operating in requesting execution environment 401a in FIG. 4A via network 508 and received by an access communications agent 403b, in FIG. 4B, and/or by a communications service 407c, in FIG. 4C. In another aspect, a communications request dataflow may include an exchange via a web protocol.

FIG. 4B, illustrates access communications agent 403b operating in access execution environment 401b of access node 504 in FIG. 5. Com-out component 406a in requesting execution environment 401a may send a communications request to access communications agent 403b to process the communications request. Alternatively or additionally, a communications request may include a communicant identifier of a contactee that identifies a communications service. FIG. 4C, illustrates communications service 407c operating in service execution environment 401c of service node 506. Com-out component 406a in requesting execution environment 401a may send a communications request to communications service 407c. A communications request may be included, for example, in an email and/or an instant message addressed to a communicant represented by a communications agent and/or may be addressed to a communications service. Those skilled in the art will understand that the communications request may be sent to one or more communications services and/or access communications agents based on one or more communicant identifiers respectively identifying one or more contactees. Com-out component 406a may interoperate with other types of content handler components 417a via content manager component 413a to create and/or otherwise construct a message and/or data unit of a communications protocol that includes a valid communications request.

A communications request generated by request constructor component 404a, in FIG. 4A, along with a communicant message and any other data to include in a communications request dataflow 706, may be provided and/or otherwise identified to content manager component 413a to send via com-out component 406a. Content manager component 413a in requesting execution environment 401a of requesting node 502 may package the one or more representations including a representation of the communications request into a communication formatted according to the communications protocol. Com-out component 406a may provide the communications request, a communicant message in some cases, and any other data to send in a communication in data representations suitable to send by communications protocol component 411a to a communications service and/or an access communications agent, such as access communications agent 403b in access execution environment 401b of access node 504. Content manager component 413a and/or com-out component 406a, in FIG. 4A, may alternatively or additionally encode and/or otherwise transform one or more of the data representations to send in a data stream such as voice stream and/or a video stream to communicate in a communication with components of access communications agent 403b in access execution environment 401b and/or components of communications service 407c in service execution environment 401c.

Sending a communications request may include identifying a communicant identifier that identifies a communications service and addressing a communication including the communicant identifier to a communicant identified by the communicant identifier. In an aspect, a communications service may be associated with a user identified by the communicant identifier and represented by an access communications agent operatively coupled to the communications service. FIG. 4B illustrates communications agent 403b operatively coupled to a communications service 407b operating in execution environment 401b with communications agent 403b. Such a communications service may operate in a user device to process communications requests. Communications agent 403b may also be operatively coupled to communications service 407c in execution environment 401c of service node 506 via network 508.

In an aspect, a communications request may be sent in a communication along with a communicant message addressed with a contactee communicant identifier. The contactee communicant identifier may identify a communicant represented by a receiving communications agent and/or access communications agent. The contactee communicant identifier and at least one other communicant identifier may be identified in the communication to authenticate and/or authorize the communications request. A communicant identifier that identifies a contactor may be included in a communication to allow an authentication and/or an authorization operation to be performed for a communications request. In an aspect, a controller component 455 illustrated in each of FIGS. 4B and 4C may perform and/or initiate an authentication and/or authorization operation.

A communications request may be sent by a com-out component 406a in a communication that identifies multiple contactee communicant identifiers. Each contactee communicant identifier may identify a respective communications service and/or access communications agent. The communications request may be sent to the respective communications service(s) and/or access communications agent(s) to process the communications request by at least one communications service.

A contactee communicant identifier may be a CC communicant identifier. A communications request may be sent that identifies one or more CC communicant identifiers identifying one or more respective CC communicants in the communication. A CC communicant identifier may be specified in a communication to send a communications request to a communications agent representing a communicant identified by the CC communicant identifier. Alternatively or additionally, CC communicant identifier may be specified in a communication to instruct a communications service and/or a communications agent that processes a communications request to send a copy of a corresponding communications response to a communications agent that represents a communicant identified by the CC communicant identifier.

With reference to FIG. 2A, a block 208 illustrates that the method includes receiving, by the first execution environment in response to the sending of the communications request, a communications response. Accordingly, a system for browsing via a communications agent includes means for receiving, by the first execution environment in response to the sending of the communications request, a communications response. For example, the arrangement in FIG. 3A, includes response director component 308 that is operable for and/or otherwise included in receiving, by the first execution environment in response to the sending of the communications request, a communications response. FIG. 4A-B illustrate response director components 408 as adaptations and/or analogs of the response director component 308 in FIG. 3A. One or more response director components 408 operate in an execution environment 401. A system for browsing via a communications agent includes one or more processors and logic encoded in one or more computer readable media for execution by the one or more processors that when executed is operable for and/or otherwise included in receiving, by the first execution environment in response to the sending of the communications request, a communications response.

FIG. 7 illustrates a communications response dataflow 708 that may include a data exchange via network 508 between communications service 407b via access communications agent 403b in FIG. 4B and a requesting execution environment 401a. The exchange may include an exchange between response-out component 418b in access execution environment 401b and a response director component 408a in requesting execution environment 401a. In another aspect, a communications response dataflow may include a data exchange via network 508 between communications service 407c in service execution environment 401c in FIG. 4C and requesting execution environment 401a. The exchange may include an exchange between response-out component 418c in service execution environment 401b and a response director component 408a in requesting execution environment 401a. A communications response may be received via a communications protocol by the requesting communications agent. In other aspects, a communications response dataflow may include an exchange via a web protocol and/or other suitable network protocol.

Receiving a communications response may include sending presentation information based on the communications response to present a representation of the communications response via an output device. Presenting the representation may include presenting the representation in a previously presented communicant message. Request information may be received in response to the input that corresponds to the representation presented in the previously presented communicant message, as described with respect to FIG. 6A. Presenting the representation may include replacing a previously presented communicant message. Request information may be received in response to the input that corresponds to the replacing representation.

In FIG. 4A, response director component 408a may receive a communications response in a message and/or data unit of a communications protocol via communications protocol component 411a. Response director component 408a may transform, translate, and/or otherwise derive, from the communications response, presentation information. A response director component 408a may send the presentation data to presentation controller component 421a and/or one or more UI element handler components 419a to present communications response data to a user of the requesting communications agent 403a. One or more content handler components 417a may be included in preparing the presentation information. URI director component 402a may be invoked to process some or all of a communications response and/or data received with a communications response, such as a communicant message to detect URIs or portions thereof so that the URIs or portions thereof may be prepared to detect any input that may correspond to a URI or a portion of a URI represented in a user interface based on the presentation information.

A communications response may be included in a plurality of communications responses received in response to sending a communications request. Each communications response in the plurality of communications responses may be received in response to sending the communications request to a plurality of respective communications services and/or access communications agents identified by a plurality of contactee communicant identifiers. A communications request may be sent by a requesting communications agent 403*a* to more than one communications service and/or access communications agent. In an aspect, more than one communications response may be received by the requesting communications agent 403*a*, in response. The communications responses and/or data based on the communications response may be received by and/or identified to response director component 408*a* as described above. In an aspect, response director component 408*a* may process the communications responses to present and/or store them as separate responses. In another aspect, response director component 408*a* may generate a combined representation of the data received in the communications response. For example, response director component 408*a* may create a combined response based on the order in which communications responses are received, based on an ordering of data in the communications responses, based on an address and/or other identifier of a sender of each response, based on a return code in each response, and the like. Response director component 408*a* may interoperate with one or more content handler components 417*a*, UI element handler components 419*a*, and/or presentation controller component 421*a* to present the more than one communications response as separate responses and/or as a combined response. A communications response and/or a combined communications response may be represented via an output device as an attachment to a communication and/or in a communicant message UI element, such as UI element 610*a* in FIG. 6A.

A communications response may be received in a communication along with a communicant message for the user represented by the requesting communications agent. The communicant message may be presented to the user via an output device. In an aspect, the communications response may be presented as an attachment to the communications message. In another aspect, the communications response may be presented in and/or may otherwise modify the presentation of the communications content.

Receiving a communications response may include receiving the communications response in a communication along with a communicant message addressed with a communicant identifier of the requesting communicant. The communicant identifier may be included in an address space of a communications protocol. The communications protocol may be the communications protocol via which the corresponding search was sent by a communications agent representing the requesting communicant. In an aspect, the communicant identifier may be in an address space of another protocol. The communicant identifier may identify the requesting communicant. The communications response may be received via the same or a different communications protocol by which the communications request was sent.

A communications response to a communications request sent by requesting communications agent 403*a* in requesting execution environment 401*a* may be received by a user agent 405*a* operating in requesting execution environment 401*a*. User agent 405*a* may receive a communications response via response director 408*a* and/or via a network protocol such as web protocol, via web protocol component 429*a* from an access communications agent and/or from a communications service. A communications response received by user agent 405*a* may be received via a message or data unit sent asynchronously via a network protocol with no corresponding request sent via the same network protocol.

In an aspect, a response director component 408 may store a communications request and/or response, a portion of a communications request and/or response, and/or metadata about a communications request and/or response in file system, database, and/or other data store. A record of communications that include a communications request and/or a communications response may be stored and/or otherwise maintained by a communications agent. A communications agent may organize the recorded information based on any of various attributes of the communications, communications requests, and/or communications responses For example, recorded information may be stored and/or presented organized by request type, communications service, access communications agent, date, time, security information, geospatial information associated with a communicant identified in a communication, response type (e.g. receipts, errors, retrieved data, requests to create, etc.). Metadata about communications requests, communications responses, and communications may be stored instead of or in addition to copies of some or all of communications requests, communications responses, and/or other portions communications sent and/or received.

With reference to FIG. 2B, a block 212 illustrates that the method includes receiving, by a communications service via a network, a communications request from a communications agent in a communication representing a first user and operating in a first execution environment, wherein the communications request identifies a first universal resource identifier (URI). Accordingly, a system for browsing via a communications agent includes means for receiving, by a communications service via a network, a communications request from a communications agent in a communication representing a first user and operating in a first execution environment, wherein the communications request identifies a first universal resource identifier (URI). For example, the arrangement in FIG. 3B, includes request-in component 312 that is operable for and/or otherwise included in receiving, by a communications service via a network, a communications request from a communications agent in a communication representing a first user and operating in a first execution environment, wherein the communications request identifies a first universal resource identifier (URI). FIG. 4B-C illustrate request-in components 412 as adaptations and/or analogs of request-in component 312 in FIG. 3B. One or more request-in components 412 operate in an execution environment 401. A system for browsing via a communications agent includes one or more processors and logic encoded in one or more computer readable media for execution by the one or more processors that when executed is operable for and/or otherwise included in receiving, by a communications service via a network, a communications request from a communications agent in a communication representing a first user and operating in a first execution environment, wherein the communications request identifies a first universal resource identifier (URI). In FIG. 4B, request-in component 412*b* is illustrated as a component of controller 455*b*. In FIG. 4C, request-in component 412*c* is illustrated as a component of controller 455*c*. In an aspect, request-in component 412*b* and request-in component 412*c* may operate as a distributed request-in component in a distributed controller.

FIG. 7, as described above, illustrates communications request dataflow 706, including and/or otherwise identifying a communications request received via network 508 by a request-in component 412 in a controller 455. A communications request dataflow may include a communications request received by request-in component 412*b* in controller 455*b* in access execution environment 401*b* of access node 504. In another aspect, a communications request may be received by a request-in component 412*c* operating in controller 455c in service execution environment 401c. FIG. 7 illustrates a communications request dataflow 706 where the communications request is transmitted from requesting execution environment 401a.

A communications request may be received by request-in component 412b, in FIG. 4B, via a network interface of access node 504 in FIG. 5. In another aspect, a communications request may be received by communications protocol component 413c, in FIG. 4C, via a network interface of service node 506. A request-in component 412 may be included in and/or may otherwise interoperate with a communications agent representing a communicant identified as a contactee in a received communication including a communications.

In FIG. 4B, a com-in component 415b may operate to detect a communications request received and/or otherwise identified in one or more messages and/or data units, of a communications protocol, received in a communication. The com-in component 415b operating in access execution environment 401b may receive data transmitted in a communication with requesting execution environment 401a via a communications protocol component 411b and a network stack 409b. A communications request in the data may be received via network 508 based on a communicant identifier of a communicant represented by access communications agent 403b in access execution environment 401b of access node 504. The com-in component 415b may provide the data to a request-in component 412b. The request-in component 412b may determine that the data is to be routed to one or more command handler components 414b to process the communications request.

In an aspect, com-in component 415b, in FIG. 4B may detect content type information to detect a communications request in a communication. Referring to FIG. 8A, com-in component 415b may detect "application/scoped-get" MIME type identifier in content-type header 804a. The "application/scoped-get" MIME type identifier may be defined to identify a communications request. Com-in component 415b may identify communications request portion 802a as including a communications request.

In response to detecting a communications request, com-in component 415b may provide some or all of the communications request to a suitable request-in component 412b in one or more request-in components in controller 455b. For example, a particular request-in component 412b may be configured to operate according to a schema defining a format and/or a vocabulary for an XML-based language for scoped-get documents as illustrated in FIG. 8A. The com-in component 415b may provide scoped-get document 806a, as a communications request, to the request-in component 412b. The request-in component 412b may operate according to the scoped-get schema. An execution environment 401 may include multiple request-in components 412 to support multiple communications request content types.

FIG. 4C, a communications protocol component 413c may operate to provide data in a data unit and/or message of a communications protocol to request-in component 412c in controller 455c in service execution environment 401c along with and/or included in communications service 407c. Request-in component 412c may operate to detect a communications request received and/or otherwise identified in the data unit(s) and/or message(s) of the communications protocol. Communications protocol component 413c operating in service execution environment 401c may receive data in one or more data units included in transmitting the data from requesting execution environment 401a to service execution environment 401c. The one or more data units may be data units of a communications protocol that include a communicant identifier of a communicant represented by service execution environment 401c.

In still another aspect, communications service 407c may operate as a web service. Communications service 407c may receive a communications request in one or more data units and/or a message of a web protocol via network 508. Such a communications request is received by communications service 407c via web protocol component 429c and application server 433c. The web service may be identified, for example, by a URL in a HTTP request sent via network 508 from requesting node 502 to service node 506. Communications service 407c may receive a communications request from requesting execution environment 401a in a data unit and/or message of a communications protocol via network 508. Such a communications request may be received by communications service 407c via communications protocol component 413c and request-in component 412c. The web service may be identified, for example by a communicant identifier in an email, an instant message, and/or any data unit or message of another suitable communications protocol sent via network 508 from requesting node 502 to service node 506.

A communicant message received via communications protocol component 413c may be processed to be presented to a user, identified as a communicant in communication including a communications request, of service execution environment 401c. In another aspect, the communicant message may be forwarded to a communications agent that represents an identified contactee, where the communications agent operates in another execution environment included in and/or provided by another node (not shown) coupled to network 508.

A communicant identifier identifying a communicant in a communication may be identified in the communication to perform an authentication operation and/or an authorization operation for a communications request received in the communication. A controller 455 may perform and/or initiate one or both these types of operations. In another aspect, a communicant message may be delivered to a communicant represented by access communications agent 403b. The communicant may be identified by a communicant identifier received by access communications agent 403b in the communication with the communications request. In yet another aspect, the contactee communicant identifier and at least one other communicant identifier may be identified in the communication by a request-in component 412. A controller 455 may perform an authentication operation and/or an authorization operation based on both the contactee communicant identifier and the at least one other communicant identifier As described above, a communications request may be received in a communication along with a communicant message addressed with a contactee communicant identifier, in an address space of a communications protocol via which data is exchanged in the communication. The communicant message may be identified by its location in the communications and/or by an identifier such as, "text/plain" or "text/html" MIME type identifier. A communicant message or portions thereof may be provided to one or more content handler components 419b. Audio data in a voice communication may be provided to an audio content handler component 419b, and video data in a video communication may be provided to a video content handler component 419b. Communicant message data may be presented, via an output device, to a communicant identified as a contactee in the communication.

In various aspects, a communications request may be detected and/or represented based on various syntaxes, grammars, vocabularies, and/or languages. For example, a communications request may be identified and/or represented according to a URI schemes, resource identifiers, command identifies, a file system search syntax, a regular expression language, a structured query language (SQL) query, a universal resource identifier schema, an XPATH based language, an XQuery based language, an XML based language, an HTML based language, and/or a keyword-value pair based language.

Exemplary resources that may be identified and/or requested via a communications request include a file, a program component, a data base record, video data, audio data, markup language, binary data, text data, an output of a service. Requested resources may be pre-existing, volatile, and/or generated in response to a request. A communications request may identify a service that when performed returns a response.

In receiving a communications request in a communication, a CC communicant identifier may be identified in the communication by a request-in component 412 and/or by a communications protocol component 411. The CC communicant identifier identifies a CC communicant. Data received in the communication may be sent by a receiving access communications agent and/or by a receiving communications service to a communications agent that represents a communicant identified by the CC communicant identifier. The data generated in and/or otherwise based on processing the communications request may be sent automatically in response to detecting and/or otherwise identifying the CC communicant identifier.

A communications request may be received in processing a transaction. The communications request may include transaction information. Receiving the communications request may include detecting a change in a state of the transaction. Processing the communications request may include changing a state of the transaction.

With reference to FIG. 2B, a block 214 illustrates that the method includes processing, based on the first URI, the communications request. Accordingly, a system for browsing via a communications agent includes means for processing, based on the first URI, the communications request. For example, the arrangement in FIG. 3B, includes command handler component 314 that is operable for and/or otherwise included in processing, based on the first URI, the communications request. FIG. 4B-C illustrate command handler components 414 as adaptations and/or analogs of command handler component 314 in FIG. 3B. One or more command handler components 414 operate in an execution environment 401. A system for browsing via a communications agent includes one or more processors and logic encoded in one or more computer readable media for execution by the one or more processors that when executed is operable for and/or otherwise included in processing, based on the first URI, the communications request. In FIG. 4B, command handler component 414*b* is illustrated as a component of controller component agent 403*b*. In FIG. 4C, command handler component 414*c* is illustrated as a component of web service 407*c*. In an aspect, command handler component 414*b* and command handler component 414*c* may operate as a distributed command handler component.

FIG. 7 illustrates a service dataflow 710 that may include a dataflow between a request-in component 412 and a command handler component 414 in a communications service 407. A command handler component 414 may operate to perform an operation included in processing a communications request, such as retrieving a resource identified in a communications request, such as file, HTML document, and database record—too name a few examples. A command handler component 414 may operate to create, store, and/or update a resource included in processing a communications request. Parameters and/or input for the processing may be received and/or identified in the communications request.

With respect to FIGS. 4B-C, a request-in component 412, in a controller 455, may invoke one or more command handler component 414 via a model subsystem 439, in response to receiving a communications request from a requesting communications agent. The command handler component(s) 414 operate to process the communications request. A model subsystem 439 may include any number of command processors, illustrated as command handler components 414, which may dynamically generate data and/or retrieve data from one or more data stores, such as model database 441*c* in FIG. 4C. The command handler component(s) 414 may be identified based on the communications request. A controller 455 may further invoke one or more response generator components 416 to generate a response to the received request based on the processing of the communications request by the command handler component(s) 414. In aspect illustrated in FIG. 4C, one or more response generator components 416*c* may invoke template engine component 445*c* to identify one or more templates and/or other static data to combine with data received from command handler component(s) 414*c* generated in processing a communications request. FIG. 4C also illustrates template database 447*c* including one or more templates illustrated by template 449*c*. One or more response generator component(s) 416 in a view subsystem 451 may interoperate with a response handler component 453 in the controller 455 to return a response generated from processing a request. The response may be returned in one or more data formats suitable for a user agent, such as user agent 405*a* in FIG. 4A and/or suitable for a communications agent 403. A response handler component 453 may receive response data from one or more response generator components 416*c* as one or more entities such as MIME entities. Alternatively or additionally, a response handler component 453 may transform data from one or more response generator component(s) 416 into one or more entities and/or representations. The response handler component 453 may send the one or more entities in a communications response, in response to a communications request received from a requesting communications agent 403. A communications application agent (not shown) may operate in a communications agent in a manner analogous to the operation of a web application agent 431 in a user agent. A communications application agent may be sent to a communications agent 403 via a communications service in one or more communications responses sent in response to one or more communications requests.

Processing a communications request may include delaying the processing for a specified period and/or otherwise processing the communications request according to a schedule. A controller 455 may maintain and monitor a schedule. The schedule may be time based and/or may be based on events that occur irregularly in time. A schedule may be specified by the communications service, a requesting communications agent, and/or may be specified by a user, such as the user represented by requesting communications agent. Scheduling information that at least partially specifies a schedule for processing a communications request may be included in and/or otherwise identified based on a communication with the communications agent.

Certain types of communications protocols do not have timeout periods in which a response is required, as opposed to web protocols which are processed according to one or more time-out periods in which a response must be sent and/or received. For example, a communications request submitted by email does not need to be processed immediately, the processing may operate for a longer period of time, and/or a communications request received once may be processed multiple times over period. A model subsystem and/or a controller component may process a communications request to generate multiple communications responses for the single communications request sent by a communications agent. The communications responses may be generated at regular intervals or generated based on an event that may occur at irregular intervals. Such operation may be preconfigured and/or identified in and/or with a communications request.

Processing a communications request may include identifying service information. A controller 455 may identify service information that identifies a communications service in response to a request-in component 412 in the controller 455 receiving a communications request in a communication. A controller 455 may identify service information by detecting an account of a communicant identified in the communication. Service information may be identified based on the account. Service information may be identified based on a requesting communicant identifier that identifies the requesting user, based on a network address of the requesting execution environment, a location of the requesting execution environment, and/or a location of the accessing execution environment.

In an aspect, service information may be received and/or otherwise identified via interaction between an access execution environment and a communicant represented by an access communications agent operating in the access execution environment. The interaction may occur in response to receiving a communications request. For example, a controller 455 may interoperate with a UI element handler component 419 to prompt a user for a password and/or other data included in processing the communications request.

In another aspect, a controller 455 may interoperate with more than one communications service 407 in response to receiving a communications request by a request-in component 412. The communications services may operate without exchanging data. In another aspect, the communications services may interoperate in processing a communications request.

With reference to FIG. 2B, a block 216 illustrates that the method includes generating, based on the processing, a communications response. Accordingly, a system for browsing via a communications agent includes means for generating, based on the processing, a communications response. For example, the arrangement in FIG. 3B, includes response generator component 316 that is operable for and/or otherwise included in generating, based on the processing, a communications response. FIG. 4B-C illustrate response generator components 416 as adaptations and/or analogs of response generator component 316 in FIG. 3B. One or more response generator components 416 operate in an execution environment 401. A system for browsing via a communications agent includes one or more processors and logic encoded in one or more computer readable media for execution by the one or more processors that when executed is operable for and/or otherwise included in generating, based on the processing, a communications response. In FIG. 4B, response generator component 416b is illustrated as a component of controller component agent 403b. In FIG. 4C, response generator component 416c is illustrated as a component of web service 407c. In an aspect, response generator component 416b and response generator component 416c may operate as a distributed response generator component.

In FIGS. 4B-C, a command handler component 414 may interoperate with a response generator component 416 in a communications service 407 in processing and/or in response to processing a communications request. In FIGS. 4B-C, a response generator component 416 may interoperate with a response-out component 418. Such interoperation may take place between the components in the same execution environment and/or may take place between components operating in different execution environments. In FIG. 4C, a command handler component 414c may interoperate with a response generator component 416c. In another aspect, a command handler component 414c in service execution environment 401c may interoperate with a response generator component 416b in access execution environment 401b. In still another aspect, in FIG. 4B, a command handler component 414b may interoperate with a response generator component 416b.

Data generated in processing a communications request may identify a resource not accessible via a web request from a user agent. Alternatively or additionally, data generated in processing a web request may identify a resource not accessible via a communications request to a communications agent. In response to receiving a communications request, a command handler component 414 may be invoked that is not accessible in processing the same or analogous request received in a web request.

In FIGS. 4B-C, response generator component 416 may identify and/or otherwise provide some or all of a command response to a response-out component 418. Response-out component 418 may perform any filtering, sorting, and/or formatting of the data generated from processing the communications request that was not performed by response generator component 416. Communications services may vary in such functionality and/in how such functionality is distributed between and/or among components. Further, response-out component 418 may prepare information received from response generator component 416 to determine whether to use a web protocol or a communications protocol to send a communications response.

With reference to FIG. 2B, a block 218 illustrates that the method includes sending, in response to receiving the communications request, the communications response to an execution environment including an agent representing the first user. Accordingly, a system for browsing via a communications agent includes means for sending, in response to receiving the communications request, the communications response to an execution environment including an agent representing the first user. For example, the arrangement in FIG. 3B, includes response-out component 318 that is operable for and/or otherwise included in sending, in response to receiving the communications request, the communications response to an execution environment including an agent representing the first user. FIGS. 4B-C illustrate response-out components 418 as adaptations and/or analogs of response-out component 318 in FIG. 3B. One or more response-out components 418 operate in an execution environment 401. A system for browsing via a communications agent includes one or more processors and logic encoded in one or more computer readable media for execution by the one or more processors that when executed is operable for and/or otherwise included in sending, in response to receiving the communications request, the communications response to an execution environment including an agent representing the first user. In FIG. 4B, response-out component 418b is illustrated as a component of controller component agent 403b. In FIG. 4C, response-out component 418c is illustrated as a component of web service 407c. In an aspect, response-out component 418b and response-out component 418c may operate as a distributed response-out component.

As described above, FIG. 7 illustrates a communications response dataflow 708 that may include a data exchange via network a communications service, illustrated in each of FIGS. 4B-C, and a requesting execution environment 401a. The exchange may include an exchange between response-out component 418b in access execution environment 401b and a response director component 408a in requesting execution environment 401a. In another aspect, a communications response dataflow may include a data exchange via network 508 between service execution environment 401c in FIG. 4C and requesting execution environment 401a. The exchange may include an exchange between response-out component 418c in service execution environment 401b and a response director component 408a in requesting execution environment 401a. A communications response dataflow may include an exchange via a web protocol and/or via a communications protocol.

Sending a communications response may include sending the communications response by an access communications agent. The communications response may be sent in response to receiving one or more command responses in response to a communications request sent from a requesting execution environment 401a. A communications response may be sent via a web protocol. A communications response may be sent via a communications protocol.

In FIGS. 4B-C, a response-out component 418 may package a communications response to transmit the communications response to requesting execution environment 401a via network 508. The response-out component 418 may send the communications response via web a protocol component 429. The communications response may be received by user agent 405a via web protocol component 429a in requesting execution environment 401a. The communications response may be sent asynchronously or may be a response to a request from user agent 405a. A response-out component 418 may send a communications response via communications protocol component 411 addressed to the requesting communicant represented by communications agent 403a in requesting execution environment 401a.

An access communications agent 403b may send the communications response based on interoperation between the access communications agent 403b and communications service 407c.

Sending a communications response may include sending the communications response in a communication along with a communicant message addressed with a communicant identifier of the requesting communicant. The communicant identifier may be included in an address space of a communications protocol. The communications protocol may be the communications protocol via which the corresponding communications request was received by a communications service. In an aspect, the communicant identifier may be in an address space of another protocol. The communicant identifier may identify the requesting communicant. The communications response may be sent via the same or a different communications protocol by which the communications request was received.

A controller 455 may identify one or more CC communicant identifier to a response-out component 418. The CC communicant identifiers may have been identified in communications request received by a response-in component 412 in the controller 455. For a corresponding communications response, the response-out component 418 may send a communication to communications agents representing respective communicants identified by the CC communicant identifier. In an aspect, a copy of the communications request may be included in a communication sent to a CC communications agent. Alternatively, or additionally, a communications request may be included in a workflow or a series of tasks. Processing a communications response may be included in such a workflow or series. A communication may be sent to a CC communications agent including a next communications request to process in the workflow or series.

A communications response may be sent in a communication along with a communicant message addressed with a requesting communicant identifier that identifies the requesting user. A communications response may be sent via a communications protocol by the accessing communications agent. A communications response may be sent via a web or other suitable network protocol. A communications response may be sent to a user agent operating in the requesting execution environment.

The methods illustrated in FIGS. 2A-B may include additional aspects supported by various adaptations and/or analogs of the arrangement of components in FIGS. 3A-B. In various aspects, performing the method illustrated in FIGS. 2A-B and/or any of its extension and/or in any of its aspects may include one or more of calling a function or method of an object, sending a message via a network; sending a message via an inter-process communication mechanism such as a pipe, a semaphore, a shared data area, and/or a queue; and/or receiving a request such as poll and responding to invoke, and sending an asynchronous message.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a non-transitory computer readable medium for use by or in connection with an instruction execution machine, system, apparatus, or device, such as a computer-based or processor-containing machine, system, apparatus, or device. As used here, a "non-transitory computer readable medium" may include one or more of any suitable media for storing the executable instructions of a computer program in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. A non-exhaustive list of conventional exemplary non-transitory computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-Ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A computer-implemented method, comprising:
    creating at least a portion of an instant messaging application that is configured to cooperate with an apparatus, the instant messaging application, when executed, configured to cause a device to:
        display an instant messaging interface including a communicant message user interface element and a send user interface element,
        receive, from the apparatus and utilizing a communications agent on the device configured to receive incoming messages addressed to a communicant identifier associated with a user of the instant messaging application, one or more user interface elements including a first button,
        in response to the receipt, from the apparatus and utilizing the communications agent on the device configured to receive the incoming messages addressed to the communicant identifier associated with the user of the instant messaging application, of the one or more user interface elements including the first button: display, in the communicant message user interface element of the instant messaging interface, the one or more user interface elements including the first button,
        receive, via the communicant message user interface element of the instant messaging interface, an indication of a selection on the first button displayed in the communicant message user interface element of the instant messaging interface,
        in response to the receipt, via the communicant message user interface element of the instant messaging interface, of the indication of the selection on the first button displayed in the communicant message user interface element of the instant messaging interface: generate a first request corresponding to the first button displayed in the communicant message user interface element of the instant messaging interface,
        in response to the generation of the first request corresponding to the first button displayed in the communicant message user interface element of the instant messaging interface: send, to the apparatus and utilizing the communications agent on the device configured to send outgoing messages addressed from the communicant identifier associated with the user of the instant messaging application, the first request corresponding to the first button displayed in the communicant message user interface element of the instant messaging interface,
        after sending, to the apparatus and utilizing the communications agent on the device configured to send the outgoing messages addressed from the communicant identifier associated with the user of the instant messaging application, the first request corresponding to the first button displayed in the communicant message user interface element of the instant messaging interface: receive, from the apparatus and utilizing the communications agent on the device configured to receive the incoming messages addressed to the communicant identifier associated with the user of the instant messaging application, a first response including at least one first image and a second button,
        in response to the receipt, from the apparatus and utilizing the communications agent on the device configured to receive the incoming messages addressed to the communicant identifier associated with the user of the instant messaging application, of the first response including the at least one first image: update the communicant message user interface element of the instant messaging interface to include, with the one or more user interface elements including the first button displayed in the communicant message user interface element of the instant messaging interface: the at least one first image and the second button,
        receive, via the communicant message user interface element of the instant messaging interface, an indication of a selection on the second button displayed in the communicant message user interface element of the instant messaging interface,
        in response to the receipt, via the communicant message user interface element of the instant messaging interface, of the indication of the selection on the second button: generate a second request corresponding to the second button displayed in the communicant message user interface element of the instant messaging interface, in response to the generation of the second request corresponding to the second button displayed in the communicant message user interface element of the instant messaging interface: send, to the apparatus and utilizing the communications agent on the device configured to send the outgoing messages addressed from the communicant identifier associated with the user of the instant messaging application, the second request corresponding to the second button displayed in the communicant message user interface element of the instant messaging interface, after sending, to the apparatus and utilizing the communications agent on the device configured to send the outgoing messages addressed from the communicant identifier associated with the user of the instant messaging application, the second request corresponding to the second button displayed in the communicant message user interface element of the instant messaging interface: receive, from the apparatus and utilizing the communications agent on the device configured to receive the incoming messages addressed to the communicant identifier associated with the user of the instant messaging application, a second response including at least one second image, in response to the receipt, from the apparatus and utilizing the communications agent on the device configured to receive the incoming messages addressed to the communicant identifier associated with the user of the instant messaging application, of the second response including the at least one second image: update the communicant message user interface element of the instant messaging interface to include, with the one or more user interface elements including the first button displayed in the communicant message user interface element of the instant messaging interface, and with the at least one first image and the second button displayed in the communicant message user interface element of the instant messaging interface: the at least one second image, in automatic response to the receipt, via the communicant message user interface element of the instant messaging interface, of the indication of the selection on the first button displayed in the communicant message user interface element of the instant messaging interface, the communicant message user interface element is automatically updated to include the at least one first image and the second button without requiring additional user input after the selection on the first button, and in automatic response to the receipt, via the communicant message user interface element of the instant messaging interface, of the indication of the selection on the second button displayed in the communicant message user interface element of the instant messaging interface, the communicant message user interface element is automatically updated to include the at least one second image without requiring additional user input after the selection on the second button; and causing storage of the at least portion of the instant messaging application.

2. The computer-implemented method of claim 1, wherein the instant messaging application is configured such that, when executed, the communicant message user interface element of the instant messaging interface is updated to include the at least one second image with the first button, the second button, and the at least one first image, such that the at least one second image is displayed simultaneously with at least a portion of the at least one first image and the second button.

3. The computer-implemented method of claim 1, wherein the instant messaging application is configured such that, when executed, the communicant message user interface element of the instant messaging interface is updated to include the at least one second image with the first button, the second button, and the at least one first image, such that the at least one second image, the first button, the second button, and the at least one first image are viewable in the communicant message user interface element of the instant messaging interface utilizing a scroll function.

4. The computer-implemented method of claim 1, wherein the instant messaging application is configured such that, when executed, the communicant message user interface element of the instant messaging interface is updated such that the at least one second image, the first button, the second button, and the at least one first image are combined on the communicant message user interface element of the instant messaging interface.

5. The computer-implemented method of claim 1, wherein the instant messaging application is configured such that, when executed, the communicant message user interface element of the instant messaging interface is updated such that the at least one second image, the first button, the second button, the at least one first image, the first request, and the second request, are included in the communicant message user interface element of the instant messaging interface.

6. The computer-implemented method of claim 1, wherein the instant messaging application is configured such that, when executed, the first button is displayed in the communicant message user interface element of the instant messaging interface as a part of a menu that is accompanied by a third image and includes at least one other button in the communicant message user interface element of the instant messaging interface.

7. The computer-implemented method of claim 1, wherein the instant messaging application is configured such that, when executed, the second button is displayed in the communicant message user interface element of the instant messaging interface as a part of a menu that accompanies the at least one first image and includes at least one other button in the communicant message user interface element of the instant messaging interface.

8. The computer-implemented method of claim 1, wherein the instant messaging application is configured such that, when executed, the at least one first image and the second button are included as at least one attachment to the first response, and the at least one second image is included as at least one attachment to the second response.

9. The computer-implemented method of claim 1, wherein the instant messaging application is configured such that, when executed, the communicant message user interface element is a dynamic portion of the instant messaging interface that permits the user to browse different content by displaying the different content as instant messages in response to an indication of a selection on different buttons that cause different requests such that the different content and the different requests are both displayed together as the instant messages in the communicant message user interface element of the instant messaging interface where at least one of the instant messages includes one or more additional different buttons to allow additional browsing in response to an indication of a selection thereon, where the instant messaging interface includes a static portion that includes one or more other user interface elements that are displayed regardless of the different content and the different requests being displayed as the instant messages in the dynamic portion of the instant messaging interface.

10. The computer-implemented method of claim 9, wherein the instant messaging application is configured such that, when executed, in response to the indication of the selection on at least one of the different buttons in the dynamic portion of the instant messaging interface, at least one of the different content is capable of being received after an extended amount of time since the instant messaging application is not a network browser.

11. The computer-implemented method of claim 1, wherein:
- the instant messaging application is configured to utilize the communications agent on the device to communicate the incoming messages when the user is a contactee and the outgoing messages when the user is a contactor, utilizing a communications protocol, such that the incoming messages and the outgoing messages are addressed using the communicant identifier which takes the form of a communication address associated with a communicant alias corresponding to the user;
- the instant messaging interface is configured to simultaneously display at least a portion of at least one of the incoming messages and at least a portion of at least one of the outgoing messages simultaneously with at least a portion of at least one of: the at least one first image or the at least one second image.

12. The computer-implemented method of claim 11, wherein the communications protocol includes a real-time, store and forward, instant messaging, request/reply protocol on top of a Transmission Control Protocol/Internet Protocol (TCP/IP).

13. The computer-implemented method of claim 1, wherein the instant messaging application is configured such that, when executed:
- the one or more user interface elements are included in connection with an instant message received previously, from the apparatus, at the device; and
- the first request and the second request are not sent in a message portion of instant messages, while the first response and the second response are displayed as instant messages.

14. The computer-implemented method of claim 1, wherein at least one of:
- the at least portion of the instant messaging application includes an entirety of the instant messaging application;
- the device includes at least one of a personal computer or a mobile device;
- the at least portion of the instant messaging application is created by a development thereof;
- the instant messaging application is configured to cooperate with the apparatus by communicating with the apparatus;
- the instant messaging application is configured such that interaction therewith is capable of invoking a network browser application;
- the apparatus includes at least one of one or more servers, or one or more relays;
- the apparatus is equipped with another communications agent;
- the communicant identifier includes at least one of a contactor identifier or a contactee identifier;
- in each instance of an operation including at least one of the generation, the updating, or the sending, in response to the receiving, the operation occurs in immediate response to the receiving;
- in each instance of an operation including at least one of the generation, the updating, or the sending, in response to the receiving, the operation occurs after at least one intermediate operation that occurs in immediate response to the receiving;
- each instance of receiving includes receiving, from the apparatus, that which was received by the apparatus from a web service;
- each instance of sending includes sending, to the apparatus, that which is sent by the apparatus to a web service;
- at least one of the first button or the second button includes a button control that initiates a command in response to a user selection thereon;
- at least one of the first button or the second button includes a hyperlink;
- selection on at least one of the first button or the second button results in a call;
- at least one of the first button or the second button is constructed using a mark-up language;
- at least one of the first button or the second button is received as a message attachment;
- at least one of the first button or the second button is associated with a uniform resource locator;
- the indication of the selection on at least one of the first button or the second button does not invoke a network browser application;
- the indication of the selection on at least one of the first button or the second button is received via the communicant message user interface element of the instant messaging interface in response to a detection of a user touch on a touchscreen of the device;
- the indication of the selection on at least one of the first button or the second button includes a signal;
- the indication of the selection includes selection information;
- the indication of the selection on at least one of the first button or the second button is received from code associated with the communicant message user interface element;
- the communications agent is separate from the instant messaging application;
- the communications agent is integrated with the instant messaging application;
- the communications agent receives the incoming messages and sends the outgoing messages;
- the incoming messages include automatically generated messages and the outgoing messages include messages edited by the user;
- the incoming messages include automatically generated messages and the outgoing messages include messages prompted by the user;
- the outgoing messages include the first request and the second request;
- the incoming messages include the first response and the second response;
- the addressing is automatic;
- the addressing is manual;
- the communicant message user interface element is uneditable;
- the communicant message user interface element is uneditable by being incapable of receiving free-form textual input;

the communicant message user interface element is editable;

the communicant message user interface element is editable by being capable of receiving free-form textual input;

each instance of the generation includes construction;

each instance of the generation includes creation;

each instance of the generation includes retrieving at least one already-existing data structure from memory for use;

each instance of the automatic response involves a response with no intermediate operation;

each instance of the automatic response involves a response with one or more intermediate automatic operations;

each instance of the automatic update involves an update with no intermediate operation;

each instance of the automatic update involves an update with one or more intermediate automatic operations;

the communicant message user interface element is automatically updated to include the at least one first image and the second button without requiring additional user input after the selection on the first button, by not requiring the additional user input after the selection on the first button while nevertheless allowing the additional user input after the selection on the first button prior the communicant message user interface element being automatically updated;

the communicant message user interface element is automatically updated to include the at least one first image and the second button without requiring additional user input after the selection on the first button, such that the communicant message user interface element is automatically updated whether or not the additional user input is received after the selection on the first button;

at least one of the first button or the second button includes at least one of an add button or a cart button;

the send user interface element includes a forward user interface element;

the send user interface element serves to send by forwarding;

the send user interface element includes the word "send";

each instance of the updating to the communicant message user interface element of the instant messaging interface includes adding to the communicant message user interface element of the instant messaging interface;

each instance of the updating does not include replacing;

the first request is an initial request;

the first request corresponds to the first button by being prompted by the selection thereon;

the communicant message user interface element of the instant messaging interface is updated to include, with the one or more user interface elements including the first button displayed in the communicant message user interface element of the instant messaging interface, and with the at least one first image and the second button displayed in the communicant message user interface element of the instant messaging interface: the at least one second image;

without requiring that the first button, the at least one first image, the second button, and the at least one second image be simultaneously displayed; or the at least portion of the instant messaging application is part of a system, where the system further comprises the apparatus and the device.

15. A non-transitory computer-readable media storing computer instructions of an instant messaging application, that when executed by one or more processors of a device, cause the one or more processors to:

display an instant messaging interface including a communicant message user interface element and a send user interface element, receive, from an apparatus and utilizing a communications agent on the device configured to receive incoming messages addressed to a communicant identifier associated with a user of the instant messaging application, one or more user interface elements including a first button, in response to the receipt, from the apparatus and utilizing the communications agent on the device configured to receive the incoming messages addressed to the communicant identifier associated with the user of the instant messaging application, of the one or more user interface elements including the first button: display, in the communicant message user interface element of the instant messaging interface, the one or more user interface elements including the first button, receive, via the communicant message user interface element of the instant messaging interface, an indication of a selection on the first button displayed in the communicant message user interface element of the instant messaging interface, in response to the receipt, via the communicant message user interface element of the instant messaging interface, of the indication of the selection on the first button displayed in the communicant message user interface element of the instant messaging interface: generate a first request corresponding to the first button displayed in the communicant message user interface element of the instant messaging interface, in response to the generation of the first request corresponding to the first button displayed in the communicant message user interface element of the instant messaging interface: send, to the apparatus and utilizing the communications agent on the device configured to send outgoing messages addressed from the communicant identifier associated with the user of the instant messaging application, the first request corresponding to the first button displayed in the communicant message user interface element of the instant messaging interface, after sending, to the apparatus and utilizing the communications agent on the device configured to send the outgoing messages addressed from the communicant identifier associated with the user of the instant messaging application, the first request corresponding to the first button displayed in the communicant message user interface element of the instant messaging interface: receive, from the apparatus and utilizing the communications agent on the device configured to receive the incoming messages addressed to the communicant identifier associated with the user of the instant messaging application, a first response including at least one first image and a second button, in response to the receipt, from the apparatus and utilizing the communications agent on the device configured to receive the incoming messages addressed to the communicant identifier associated with the user of the instant messaging application, of the first response including the at least one first image: update the communicant message user interface element of the instant messaging interface to include, with the one or more user interface elements including the first button displayed in the communicant message user interface element of the instant messaging interface: the at least one first image and the second button, receive, via the communicant message user interface element of the instant messaging interface, an indication of a selection on the second button displayed in the communicant message user interface element of the instant messaging interface, in response to the receipt, via the communicant message user interface element of the instant messaging interface, of the indication of the selection on the second button: generate a second request corresponding to the second button displayed in the communicant message user interface element of the instant messaging interface, in response to the generation of the second request corresponding to the second button displayed in the communicant message user interface element of the instant messaging interface: send, to the apparatus and utilizing the communications agent on the device configured to send the outgoing messages addressed from the communicant identifier associated with the user of the instant messaging application, the second request corresponding to the second button displayed in the communicant message user interface element of the instant messaging interface, after sending, to the apparatus and utilizing the communications agent on the device configured to send the outgoing messages addressed from the communicant identifier associated with the user of the instant messaging application, the second request corresponding to the second button displayed in the communicant message user interface element of the instant messaging interface: receive, from the apparatus and utilizing the communications agent on the device configured to receive the incoming messages addressed to the communicant identifier associated with the user of the instant messaging application, a second response including at least one second image, in response to the receipt, from the apparatus and utilizing the communications agent on the device configured to receive the incoming messages addressed to the communicant identifier associated with the user of the instant messaging application, of the second response including the at least one second image: update the communicant message user interface element of the instant messaging interface to include, with the one or more user interface elements including the first button displayed in the communicant message user interface element of the instant messaging interface, and with the at least one first image and the second button displayed in the communicant message user interface element of the instant messaging interface: the at least one second image, in automatic response to the receipt, via the communicant message user interface element of the instant messaging interface, of the indication of the selection on the first button displayed in the communicant message user interface element of the instant messaging interface, the communicant message user interface element is automatically updated to include the at least one first image and the second button without requiring additional user input after the selection on the first button, and in automatic response to the receipt, via the communicant message user interface element of the instant messaging interface, of the indication of the selection on the second button displayed in the communicant message user interface element of the instant messaging interface, the communicant message user interface element is automatically updated to include the at least one second image without requiring additional user input after the selection on the second button.

16. The non-transitory computer-readable media of claim 15, wherein:

the instant messaging application is configured to utilize the communications agent on the device to communicate the incoming messages when the user is a contactee and the outgoing messages when the user is a contactor, utilizing a communications protocol, such that the incoming messages and the outgoing messages are addressed using the communicant identifier which takes the form of a communication address associated with a communicant alias corresponding to the user;

the instant messaging interface is configured to simultaneously display at least a portion of at least one of the incoming messages and at least a portion of at least one of the outgoing messages, such that the communicant message user interface element of the instant messaging interface is updated so that the at least one second image, the first button, the second button, and the at least one first image are included together in the communicant message user interface element of the instant messaging interface; and the communications protocol includes a real-time, store and forward, instant messaging, request/reply protocol on top of a Transmission Control Protocol/Internet Protocol (TCP/IP).

17. The non-transitory computer-readable media of claim 16, wherein:

the at least one first image and the second button are included as at least one attachment to the first response, and the at least one second image is included as an attachment of the second response;

the communicant message user interface element of the instant messaging interface is updated to include the at least one second image with the first button, the second button, and the at least one first image, such that the at least one second image is displayed with at least a portion of the at least one second image, the first button, and the second button, either simultaneously, or viewable together via a scroll function; and the communicant message user interface element is a dynamic portion of the instant messaging interface that permits the user to browse different content by displaying the different content as instant messages in response to an indication of a selection on different buttons that cause different requests such that the different content and the different requests are both displayed together as the instant messages in the communicant message user interface element of the instant messaging interface, where at least one of the instant messages includes one or more additional different buttons to allow additional browsing in response to an indication of a selection thereon, where the instant messaging interface includes a static portion that includes one or more other user interface elements that are displayed independent of the different content and the different requests being displayed as the instant messages in the dynamic portion of the instant messaging interface.

18. The non-transitory computer-readable media of claim 17, wherein at least one of:

the first button is displayed as a part of a menu that is accompanied by a third image and includes at least one other button, or the second button is displayed as a part of a menu that is accompanied by the first image and includes at least one other button.

19. The non-transitory computer-readable media of claim 17, where the instant messaging application is configured such that the first request and the second request are not sent in a message portion of instant messages, while the first response and the second response are displayed as instant messages.

20. A computer-implemented method, comprising:
creating at least a portion of an instant messaging application that is configured to cooperate with an apparatus, the instant messaging application, when executed, configured to cause a device to:
  display an instant messaging interface including a message user interface element and a send user interface element,
  receive, from the apparatus and with a communicant identifier associated with a user of the instant messaging application, one or more user interface elements including a first menu item,
  in response to the receipt, from the apparatus and with the communicant identifier associated with the user of the instant messaging application, of the one or more user interface elements including the first menu item: display, in the message user interface element of the instant messaging interface, the one or more user interface elements including the first menu item,
  receive, via the message user interface element of the instant messaging interface, an indication of a selection on the first menu item displayed in the message user interface element of the instant messaging interface,
  in response to the receipt, via the message user interface element of the instant messaging interface, of the indication of the selection on the first menu item displayed in the message user interface element of the instant messaging interface: generate a first request,
  in response to the generation of the first request: send, to the apparatus and with the communicant identifier associated with the user of the instant messaging application, the first request,
  after sending, to the apparatus and with the communicant identifier associated with the user of the instant messaging application, the first request: receive, from the apparatus and with the communicant identifier associated with the user of the instant messaging application, a first response including at least one first image and a second menu item,
  in response to the receipt, from the apparatus and with the communicant identifier associated with the user of the instant messaging application, of the first response including the at least one first image: add, to the message user interface element of the instant messaging interface: the at least one first image and the second menu item in the message user interface element of the instant messaging interface,
  receive, via the message user interface element of the instant messaging interface, an indication of a selection on the second menu item displayed in the message user interface element of the instant messaging interface,
  in response to the receipt, via the message user interface element of the instant messaging interface, of the indication of the selection on the second menu item: generate a second request,
  in response to the generation of the second request: send, to the apparatus and with the communicant identifier associated with the user of the instant messaging application, the second request,
  after sending, to the apparatus and with the communicant identifier associated with the user of the instant messaging application, the second request: receive, from the apparatus and with the communicant identifier associated with the user of the instant messaging application, a second response including at least one second image,
  in response to the receipt, from the apparatus and with the communicant identifier associated with the user of the instant messaging application, of the second response including the at least one second image: add, to the at least one first image displayed in the message user interface element of the instant messaging interface: the at least one second image in the message user interface element of the instant messaging interface,
  in automatic response to the receipt, via the message user interface element of the instant messaging interface, of the indication of the selection on the first menu item displayed in the message user interface element of the instant messaging interface, the at least one first image and the second menu item are automatically added to the message user interface element of the instant messaging interface without requiring additional user input after the selection on the first menu item, and
  in automatic response to the receipt, via the message user interface element of the instant messaging interface, of the indication of the selection on the second menu item displayed in the message user interface element of the instant messaging interface, the at least one second image is automatically added to the at least one first image displayed in the message user interface element of the instant messaging interface without requiring additional user input after the selection on the second menu item; and
causing storage of the at least portion of the instant messaging application.

21. The computer-implemented method of claim 20, wherein:
the instant messaging application is configured such that, when executed, the one or more user interface elements including the first menu item is displayed in a dynamic portion of the instant messaging interface that displays the at least one first image, the at least one second image, the first request, and the second request as instant messages; and the message user interface element and the send user interface element are part of a static portion of the instant messaging interface such that the message user interface element and the send user interface element are displayed independent of the instant messages; and
the instant messaging application is configured to utilize a first communications agent on the device to communicate incoming messages when the user is a contactee and outgoing messages when the user is a contactor, utilizing a communications protocol, such that the incoming messages and the outgoing messages are addressed using the communicant identifier which takes the form of a communication address associated with a communicant alias corresponding to the user.

22. The computer-implemented method of claim 21, wherein the communications protocol includes a real-time, store and forward, instant messaging, request/reply protocol on top of a Transmission Control Protocol/Internet Protocol (TCP/IP), and the apparatus communicates with a web service utilizing a hypertext transfer protocol (HTTP).

23. The computer-implemented method of claim 21, wherein the communications protocol includes a publish-subscribe protocol on top of a Transmission Control Protocol/Internet Protocol (TCP/IP).

24. A non-transitory computer-readable media storing computer instructions of an instant messaging application, that when executed by one or more processors of a device, cause the one or more processors to:
   display an instant messaging interface including a message user interface element and a send user interface element,
   receive, from an apparatus and with a communicant identifier associated with a user of the instant messaging application, one or more user interface elements including a first menu item,
   in response to the receipt, from an apparatus and with the communicant identifier associated with the user of the instant messaging application, of the one or more user interface elements including the first menu item: display, in the message user interface element of the instant messaging interface, the one or more user interface elements including the first menu item,
   receive, via the message user interface element of the instant messaging interface, an indication of a selection on the first menu item displayed in the message user interface element of the instant messaging interface,
   in response to the receipt, via the message user interface element of the instant messaging interface, of the indication of the selection on the first menu item displayed in the message user interface element of the instant messaging interface: generate a first request,
   in response to the generation of the first request: send, to the apparatus and with the communicant identifier associated with the user of the instant messaging application, the first request,
   after sending, to the apparatus and with the communicant identifier associated with the user of the instant messaging application, the first request: receive, from the apparatus and with the communicant identifier associated with the user of the instant messaging application, a first response including at least one first image and a second menu item,
   in response to the receipt, from the apparatus and with the communicant identifier associated with the user of the instant messaging application, of the first response including the at least one first image: add, to the message user interface element of the instant messaging interface: the at least one first image and the second menu item in the message user interface element of the instant messaging interface,
   receive, via the message user interface element of the instant messaging interface, an indication of a selection on the second menu item displayed in the message user interface element of the instant messaging interface,
   in response to the receipt, via the message user interface element of the instant messaging interface, of the indication of the selection on the second menu item: generate a second request,
   in response to the generation of the second request: send, to the apparatus and with the communicant identifier associated with the user of the instant messaging application, the second request,
   after sending, to the apparatus and with the communicant identifier associated with the user of the instant messaging application, the second request: receive, from the apparatus and with the communicant identifier associated with the user of the instant messaging application, a second response including at least one second image,
   in response to the receipt, from the apparatus and with the communicant identifier associated with the user of the instant messaging application, of the second response including the at least one second image: add, to the at least one first image displayed in the message user interface element of the instant messaging interface: the at least one second image in the message user interface element of the instant messaging interface,
   in automatic response to the receipt, via the message user interface element of the instant messaging interface, of the indication of the selection on the first menu item displayed in the message user interface element of the instant messaging interface, the at least one first image and the second menu item are automatically added to the message user interface element of the instant messaging interface without requiring additional user input after the selection on the first menu item, and
   in automatic response to the receipt, via the message user interface element of the instant messaging interface, of the indication of the selection on the second menu item displayed in the message user interface element of the instant messaging interface, the at least one second image is automatically added to the at least one first image displayed in the message user interface element of the instant messaging interface without requiring additional user input after the selection on the second menu item.

25. The non-transitory computer-readable media of claim 24, wherein:
   the instant messaging application is configured such that, when executed, the one or more user interface elements including the first menu item is displayed in a dynamic portion of the instant messaging interface that displays the at least one first image, the at least one second image, the first request, and the second request as instant messages; and the message user interface element and the send user interface element are part of a static portion of the instant messaging interface such that the message user interface element and the send user interface element are displayed independent of the instant messages; and
   the instant messaging application is configured to utilize a first communications agent on the device to communicate incoming messages when the user is a contactee and outgoing messages when the user is a contactor, utilizing a communications protocol, such that the incoming messages and the outgoing messages are addressed using the communicant identifier which takes the form of a communication address associated with a communicant alias corresponding to the user.

26. The non-transitory computer-readable media of claim 25, wherein the communications protocol includes a real-time, store and forward, instant messaging, request/reply protocol on top of a Transmission Control Protocol/Internet Protocol (TCP/IP), and the apparatus communicates with a web service utilizing a hypertext transfer protocol (HTTP), where the web service is a source of the one or more user interface elements including the first menu item, the at least one first image, the at least one second image, the first request, and the second request.

27. The non-transitory computer-readable media of claim 26, wherein the communications protocol includes a publish-subscribe protocol on top of the Transmission Control Protocol/Internet Protocol (TCP/IP), and the first request is capable of being a first network communication of an exchange between the device and the apparatus.

28. The non-transitory computer-readable media of claim 25, wherein the instant messaging application is configured such that, when executed, at least one of: the first menu item or the second menu item is displayed to engage the user in connection with at least a portion of a shopping transaction.

29. The non-transitory computer-readable media of claim 28, wherein the instant messaging application is configured such that, when executed, at least another, subsequent portion of the shopping transaction is initiated via a network browser application, in response to a selection of at least one user interface element that is received in connection with at least one instant message.

30. The non-transitory computer-readable media of claim 25, wherein the instant messaging application is configured such that, when executed, at least one user interface element is received, from the apparatus and with the communicant identifier associated with the user of the instant messaging application, to permit the user to save browsed content in connection with favorites of the user.

* * * * *